United States Patent
Wang et al.

(10) Patent No.: US 12,278,991 B1
(45) Date of Patent: Apr. 15, 2025

(54) ENHANCED VIDEO STREAMING AND REFERENCE FRAME SYNCHRONIZATION

(71) Applicant: Amazon Technologies, Inc., Seattle, WA (US)

(72) Inventors: Qi Keith Wang, Cambridge (GB); Ramin Ghorashi, Cambridge (GB); Stephen John Bannister, Burwell (GB); Ilya Brailovskiy, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/665,967

(22) Filed: May 16, 2024

Related U.S. Application Data

(62) Division of application No. 17/830,628, filed on Jun. 2, 2022, now Pat. No. 12,028,549.

(51) Int. Cl.

| | | |
|---|---|---|
| H04N 19/593 | (2014.01) | |
| H04N 19/124 | (2014.01) | |
| H04N 19/139 | (2014.01) | |
| H04N 19/176 | (2014.01) | |
| H04N 19/625 | (2014.01) | |
| H04N 19/70 | (2014.01) | |

(52) U.S. Cl.
CPC ......... *H04N 19/593* (2014.11); *H04N 19/124* (2014.11); *H04N 19/139* (2014.11); *H04N 19/176* (2014.11); *H04N 19/625* (2014.11); *H04N 19/70* (2014.11)

(58) Field of Classification Search
CPC ............... H04N 19/593; H04N 19/124; H04N 19/139; H04N 19/176; H04N 19/625; H04N 19/70
See application file for complete search history.

(56) References Cited

U.S. PATENT DOCUMENTS

| | | | |
|---|---|---|---|
| 6,546,052 B1 | 4/2003 | Maeda | |
| 7,016,411 B2 | 3/2006 | Azuma | |
| 7,835,439 B2 * | 11/2010 | Witt | H04N 19/119 |
| | | | 375/240.26 |
| 7,957,465 B2 * | 6/2011 | Dei | H04N 19/61 |
| | | | 375/240.12 |
| 10,567,796 B2 | 2/2020 | Shen | |
| 11,323,754 B2 * | 5/2022 | Shi | H04N 23/698 |

(Continued)

*Primary Examiner* — Hung H Lam
(74) *Attorney, Agent, or Firm* — K&L Gates LLP

(57) ABSTRACT

Methods of video streaming are generally described. In some examples, a camera device periodically captures an image, communicates encoded frame data representing that image to a server, and decodes and stores the previously encoded frame data as a background picture. The server receives the encoded frame data, decodes it, and stores the decoded frame in a buffer for future use. Subsequently, upon initiation of a streaming session, the camera device captures another image and encodes a predicted key frame based on differences between the captured image and the background picture. The camera device sends the predicted key frame to the server, which receives it and reconstructs a facsimile of the captured image utilizing the previously decoded frame stored in the buffer. Methods of acknowledging successfully decoded frames for use in selecting background pictures is also described.

20 Claims, 8 Drawing Sheets

(56) References Cited

U.S. PATENT DOCUMENTS

| | | | |
|---|---|---|---|
| 11,425,412 B1 | 8/2022 | Gigliotti | |
| 2009/0180533 A1* | 7/2009 | Bushell | H04N 19/132 |
| | | | 375/240.01 |
| 2010/0220787 A1* | 9/2010 | Yamasaki | H04N 19/395 |
| | | | 375/E7.125 |
| 2012/0169923 A1* | 7/2012 | Millar | H04N 19/174 |
| | | | 348/399.1 |
| 2017/0105004 A1* | 4/2017 | Chen | H04N 19/162 |
| 2018/0131950 A1 | 5/2018 | Guo | |
| 2021/0218930 A1* | 7/2021 | Tsukagoshi | H04N 19/70 |

* cited by examiner

ENHANCED VIDEO STREAMING AND REFERENCE FRAME SYNCHRONIZATION

CROSS-REFERENCE TO RELATED APPLICATIONS

This application is a divisional of and claims priority to U.S. patent application Ser. No. 17/830,628, filed Jun. 2, 2022, now U.S. Pat. No. 12,028,549. The disclosure of the foregoing to document, application is incorporated herein by reference in its entirety.

BACKGROUND

Video and/or other media may be sent between computing devices over a network. In some examples, videos may be encoded by a first computing device, sent to a remote computing device, decoded, and played back while subsequent portions of the video are still being transmitted to the remote computing device by the first computing device. Such video transmission and playback is often referred to as "streaming." Network conditions can change during streaming due to changes and/or increases in network traffic. For example, network conditions may sometimes deteriorate which may lead to delays in streaming of video and/or other media files.

DETAILED DESCRIPTION

Figure 1:
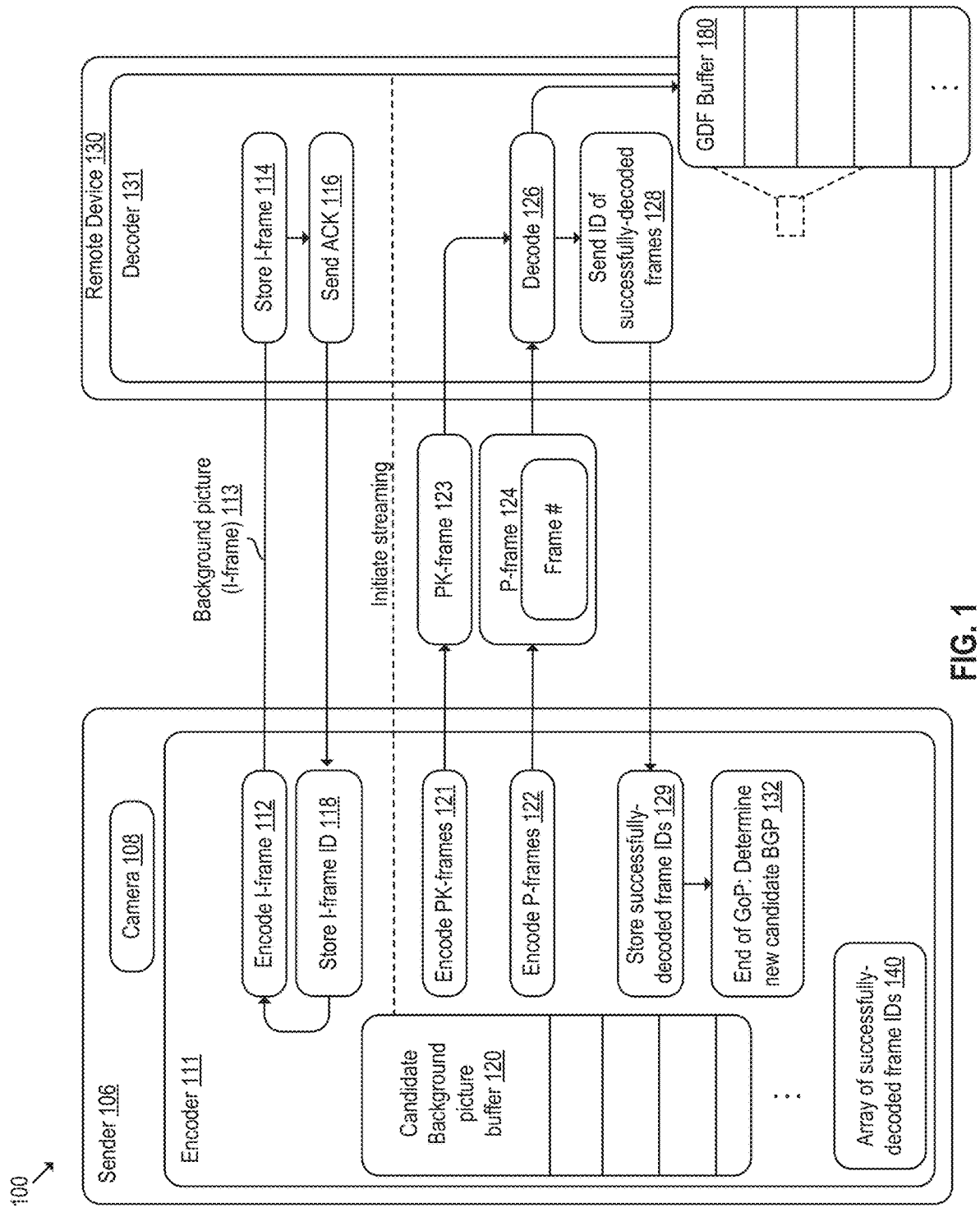
FIG. 1 depicts an example system for enhanced encoding and decoding of a video bit stream, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the scope of the present disclosure. The following detailed description is not to be taken in a limiting sense, and the scope of the embodiments of the present invention is defined only by the claims of the issued patent.

The transmission and presentation of information using streaming delivery technology is rapidly increasing. One challenge related to video streaming technologies is the desire to reduce end-to-end latency, jitter, and other undesirable effects caused by prevailing network conditions while maintaining a sufficiently high video quality. One example technique that may be employed to reduce latency involves the reduction of video segment duration (e.g., reduction of group of pictures (GoP) size). However, the reduction of segment duration may result in more frequent transmission of I-frames, which have large data sizes and are computationally resource intensive and inefficient to encode. Transmission of the I-frames cause spikes in network traffic due to the larger data size of such frames relative to inter-coded frames.

Techniques for improved encoding and decoding of reference frames used in video streaming are described herein. In digital video technology, a video may be represented by a number of video frames that may be displayed in sequence during playback. A video frame is comprised of rows and columns of pixels (arranged in a two-dimensional grid). The resolution of a particular video frame is described by the width of the frame, in terms of a first number of pixels, by the height of the frame, in terms of a second number of pixels. Video frames may be compressed using different picture types or frame types, such as Intra-coded picture frames, predicted picture frames, and/or bi-predictive frames. The term "frame" can refer to an entire image captured during a time interval (e.g., all rows and columns of pixels comprising a particular image). The term "picture" can refer to either a frame or a field. A "field" is a partial image of a frame, which can be represented by either the odd-numbered or even-numbered scanning lines of the frame. The term "picture" can refer to either a frame or a field. "Image data" can refer to image data output by an image signal processor in a particular format (e.g., YUV420 format). "Frame data" can refer to an encoded frame generated by an encoder (e.g., encoded difference data for an inter-coded frame and/or intra-encoded data for an intra-encoded frame). For simplicity, in some cases, the various techniques described herein may be described in reference to "frames" or "pictures" even though the actual operations may be performed on pixels and/or groups of pixels (e.g., on frame data or picture data).

A frame rate of a video generally refers to the number of frames recorded for a given period of time, e.g. 60 frames per second (FPS).

It will be appreciated that, generally, the amount of data required to represent a video frame will increase as the resolution of the video frame increases (given a relatively constant frame rate), and as the frame rate increases (given a relatively constant resolution). It will be appreciated that given the amount of data required to represent a frame, videos recorded at even a moderate resolution and frame rate will quickly begin to require a very large amount of data for representation. This is especially problematic for video streaming, as most networks have bandwidth limitations.

To ameliorate this, video data is frequently compressed to reduce the amount of data necessary to represent a given length of video at a given resolution. This compression is generally characterized as encoding video data.

So-called lossy compression typically refers to intra-frame compression where the amount of data used to represent a given picture is reduced relative to a raw or native format of the picture. One common example of intra-frame compression uses a frequency domain-based image transform such as a discrete cosine transform (DCT), a Fourier transform, a Hadamard transform, an integer transform, etc., to represent the image data in the frequency domain.

In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during a quantization process and rounded to the nearest integer, to further compress the data. In various examples, the quantization factors may be determined using a rate control algorithm. A rate control algorithm may solve an optimization problem to determine the number of bits that should be used to encode macroblocks (two-dimensional groupings of contiguous pixels in the picture) of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After quantization, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data.

Reference frames are frames of a compressed video that are used to define other frames and come in various types. A compressed video may comprise one or more frames that do not include all of the pixel data within the frames themselves, but rather reference pixel values of other frames (e.g., reference frames). Intra-coded frames ("I-frames") include detailed pixel data in order to be self-decodable and to provide reference pixel values for other inter-coded frames. As a result, I-frames do not require other video frames in order to be decoded, but provide the lowest amount of data compression.

An encoding approach can encode a frame as an intra-coded frame, or encode a picture as an intra-coded picture. Regions other than a frame or field can be defined and utilized for encoding as well. For example, an encoding approach can utilize a "slice" representing a defined region of a frame or picture that is encoded separately from any other region. In an approach utilizing slices, such as H.264, a frame or picture can be characterized as intra-coded if all of the slices making up the frame or picture are intra-coded.

Predicted frames ("P-frames") contain only the changes in the pixel values from the previous frame, and therefore P-frames use data from previous frames to decompress the P-frame. As a result, P-frames are more compressible than I-frames. Bi-predictive frames ("B-frames") can be decoded using both previous and forward frames for data reference. As set forth above, frequent transmission of I-frames can cause network congestion and/or jitter because of their increased size (e.g., the number of bits of data comprising the I-frame) relative to the P-frames and B-frames.

An encoding approach can encode a frame as an inter-coded frame such as P-frame or B-frame, or encode a picture as an intra-coded picture, such as a P-picture or a B-picture. Regions other than a frame or field can be defined and utilized for encoding as well. For example, an encoding approach can utilize a slice representing a defined region of a frame or picture that is encoded separately from any other region.

Just because a frame is intra-coded and does not reference the contents of another frame, that does not necessarily mean that it does not depend on a decoder having been set up with a particular state. Thus, just because a frame is intra-coded, that does not mean that receiving that frame is enough to allow decoding from that point. A key frame is a frame that is configured to act as a decoder refresh and allow decoding to proceed from that frame.

For example, in H.264 an instantaneous decoder refresh frame (IDR-frame) is a special intra-coded frame (an I-frame) that acts as a key frame. Conventionally, the IDR-frame causes all reference pictures in a decoded picture buffer (DPB) to be flushed, so that no subsequent video frames can reference any picture prior to the IDR-frame. Conventionally, this means that segments defined by these IDR-frames are self-decodable and do not depend on or reference any pictures in previous segments. The segments may be characterized as a group of pictures (GoP). The GoP size may indicate a number of frames that may be encoded until the next IDR-frame is encoded. For example, if the GoP size is 50, an encoder device may encode an I-frame followed by 49 inter-coded frames which may reference the I-frame. Conventionally, the $51^{st}$ frame would again be encoded as an I-frame at the start of the next GoP. In various examples, implementations of encoding and/or decoding techniques are described with respect to "frames" of image data (e.g., inter-coded frames, frame numbers, etc.). However, it should be noted that such example techniques involving frames could similarly be applied in the context of pictures (e.g. inter-coded pictures, picture numbers, etc.) and slices.

In some video streaming scenarios, live streaming of video data, whereby video encoding is occurring in an ongoing fashion as previously encoded frames of image data are sent to, and decoded by, a decoder device, may occur only in certain contexts. For example, some stationary camera devices may initiate video streaming only upon receiving an instruction to stream video and/or only upon detection of motion and/or some other triggering event (e.g., at a particular time and/or due to a door being opened, etc.). Apart from motion and changing lighting conditions, the frames of image data captured by such stationary camera devices may typically remain relatively static.

Described herein are various video encoding and decoding techniques that may be used during streaming of video to greatly reduce and in some cases even potentially eliminate the use of intra-coded (I-frames) during streaming. A new frame type referred to herein as a predicted key frame (PK-frame) is described. PK-frames are key frames that, in contrast with conventional approaches involving intra-coded key frames, are compressed via use of reference to a reference frame or picture. Additionally, new techniques for reference frame synchronization are discussed herein which coordinate a bank of available frames or pictures to use as a subsequent reference frame or picture. By greatly reducing, and in some cases eliminating, the transmission of intra-coded frames (I-frames) during streaming, jitter and latency may be greatly reduced while increasing video quality at a given bit rate. Additionally, video quality may be improved as the bit rate may be increased in many cases without incurring latency since the "burstiness" of the video traffic may be greatly reduced due to the elimination of I-frame transmission.

In the various techniques described herein, a camera device (e.g., any device with an integrated image sensor and/or a device that is configured in communication with an image sensor) may include an encoder. The camera device may capture images (represented as image data) within the field-of-view of the lens of the camera of the camera device. Such images may be frames of image data and may be captured periodically, semi-periodically, randomly, etc., according to the desired implementation. The image data captured by the camera device may be encoded using intra-encoding techniques as I-frame data and may be sent, using any desired protocol, to a remote computing device that includes a decoder. The remote computing device may be, for example, one or more servers and/or other compute nodes that may decode or transcode the frame data and may provide video data to user devices for display. In some other examples, the remote computing device may be a user device (e.g., a smart phone, personal computer, etc.) that may be effective to decode and render the decoded frames without an intervening server. The particular architecture may depend on the desired implementation. In any case, the images captured by a camera device may represent views of a physical environment within the field-of-view of the camera device. Frame data representing one or more images may be transmitted occasionally or periodically so that a user may see a somewhat recent image from the perspective of the camera device even if no event has triggered live video streaming. Additionally, as described in further detail below, a background picture that was successfully received and decoded by the decoder may be used as a reference frame for subsequent encoding/decoding of image data. Communicated frames (or pictures or slices) may include identifier data (e.g., a frame number or picture number or slice number) that may be used to distinguish the frame (or picture or slice) from among other frames (or pictures or slices). Upon successful receipt and/or decoding of a frame, picture, or slice, the remote computing device including the decoder may send an acknowledgement message (e.g., real-time transport control protocol (RTCP) message data and/or message data using any desired communication protocol) to the encoder device indicating an ID of the received frame, picture, or slice. In some cases, frame data that is sent prior to initiation of streaming may be utilized as a reference frame or picture.

Conventionally, the term key frame is commonly utilized to refer to a frame that can be utilized as a starting point for video decoding (and video playing) with a default decoder state, e.g. without requiring knowledge of prior frames and without requiring any special decoder state such as knowledge of quantization matrices or probability tables determined or calculated based on prior frames or prior streaming session data. VP8 and VP9 specifically define key frames generally in accord with this conventional understanding. In H.264, instantaneous decoding refresh pictures (IDR pictures) are commonly characterized as key frames. Other protocols refer to similar frames as providing a "point of random access" (MPEG-2) or "stream access point" (MPEG-4).

In many protocols utilizing a group of pictures (GoP) scheme, a key frame will mark the beginning of a group of pictures, allowing predictive frames within that group of pictures to use other frames within that group of pictures as reference frames. In many such protocols, frames that can be utilized as a reference frame will frequently be stored in a reference buffer. In many approaches, a key frame will serve as an indicator to clear this reference buffer, as future frames will no longer use any frames from a prior group of pictures. For example, in H.264, an instantaneous decoding refresh picture (IDR picture) serves as a signal for a decoder to mark all pictures in the reference buffer as unused for reference.

In accordance with one or more preferred implementations, a predictive key frame (PK-frame) represents a frame that can be utilized as a starting point for video decoding (and video playing) with a default decoder state which does not require knowledge of any prior frames, except in that it requires knowledge of a background frame or picture that is used as a reference frame or picture for the PK-frame. This background frame or picture could be a frame or picture from the same group of pictures, from a prior group of pictures, or could be a frame or picture from outside of the streaming session, e.g. stored before the streaming session even began. A background picture or frame may represent, for example, an intra-coded frame of image data generated by the encoder and/or sent to the decoder prior to the initiation of streaming, or a reconstructed frame of image data generated by combining inter-coded frame difference data with a reference frame.

As noted above, in accordance with one or more preferred implementations, frame data representing an image may be transmitted occasionally or periodically from a camera device to a remote system, and such frame data may be stored at the camera device and the remote system as a background picture for future use in encoding and decoding PK-frames.

In accordance with one or more preferred implementations, when a triggering event occurs (e.g., motion detection by the camera device) and video streaming is to be initiated, an encoder may encode a first frame of the initial GoP as a PK-frame using a stored background picture as a reference frame. In some examples, the PK-frame may be encoded using P-frame syntax, encoding differences (e.g., differences in pixel values and/or macroblock values, depending on the particular video encoding technology being used) between the current frame and a most-recently acknowledged background picture (as described in more detail hereinbelow). Additionally, in some cases, motion vectors may be used to reference shifting blocks of pixels between the PK-frame and the background picture data.

In accordance with one or more preferred implementations, an encoder encodes frame data for a PK-frame to include overlay metadata comprising an overlay frame identifier of the PK-frame and an overlay frame identifier of the most-recent background picture that was acknowledged by the recipient device (e.g. the remote system). The decoder may parse the overlay metadata to determine the overlay frame identifier of the background picture that should be used to decode the PK-frame. The decoded PK-frame (as decoded using the specified background picture) may be used by the decoder as a reference frame for a subsequent P-frame. The decoded frame comprising the combination of the data from the PK-frame and the most-recently acknowledged background picture may be stored in a "good decoded frames" buffer ("GDF buffer") by the decoder.

Thereafter, the encoder may encode each of a plurality of subsequent frames of the GoP as a P-frame generally in accordance with a conventional process under an appropriate protocol. Additionally, though, each such P-frame may be encoded to include overlay metadata indicating an overlay frame identifier for that P-frame. This overlay frame identifier can be used to acknowledge successful receipt of the P-frame, as described in more detail hereinbelow, and can be used to indicate use of the frame as a background frame or picture for a PK-frame.

Upon receipt, the decoder may decode each of these P-frames using one or more corresponding reference frames in accordance with a conventional process under an appropriate protocol. Additionally, the decoder preferably stores at least some successfully decoded frames in a buffer, and stores an association of these stored frames with the corresponding overlay frame identifier.

For example, the first PK-frame may be decoded using the specified background picture and the decoded frame may be stored in a decoded frame buffer as a new reference frame R0. The next received frame, a P-frame, may be decoded by adding difference information coded in the P-frame to the reference frame R0 stored in the decoded frame buffer. The newly-decoded frame may be stored in the decoded frame buffer as a new reference frame R1, and the process may continue. Additionally, each successfully-decoded frame of the GoP (including successfully decoded P-frames) may be stored in a good decoded frames buffer ("GDF buffer") and an acknowledgement message may be sent (using any desired protocol) to the encoder. Alternatively, the newly-decoded frame stored in the decoded frame buffer may have a flag set indicating that it is a good decoded frame, or an entry may be added to a good decoded frames list or array indicating that the newly-decoded frame stored in the decoded frame buffer is a good decoded frame.

The acknowledgement message may include the overlay frame identifier of the successfully-decoded frame. Upon receiving an acknowledgment message including an overlay frame identifier of a successfully-decoded frame, a camera device or encoder system may store the overlay frame identifier in a successfully-decoded frames array or list. Periodically or continually, depending on the implementation, during the GoP, the encoder may generate a new candidate background picture for a subsequent GoP by combining difference information for a current P-frame with a reference frame for the P-frame and storing the new candidate background picture in a candidate background picture buffer (indexed by the overlay frame identifier of the P-frame). This operation may be performed periodically during the GoP to account for the changing background picture due to motion in the scene. As the streaming session continues, the original background picture becomes less similar to the newly-generated, incoming frames of image data. As a result, the original background picture becomes less effective as a prediction reference. Accordingly, the encoder may generate new candidate background pictures that reflect more recent motion in the scene. These candidate background pictures may be used for subsequent PK-frames, as described herein. The frequency at which, or number of times that, the encoder generates candidate background pictures (e.g., candidate BGPs) may depend on the size of the candidate background picture buffer (with more resource-constrained camera devices often having smaller buffer sizes). In some cases, the frequency at which, or number of times that, the encoder performs this operation may be correlated with motion in the scene. However, in some cases it may be advantageous to limit the frequency at which or number of times that the encoder generates candidate background pictures in order to reduce power consumption and/or buffer size on the camera device. Each of the candidate background pictures stored in the candidate background picture buffer may include metadata that may be used to identify that frame (e.g., an overlay frame identifier, frame number, picture number, or other identifying data).

At the start of a new GoP, the encoder may cross reference the array of successfully-decoded frames (e.g., a decoded pictures array storing identifiers of successfully-decoded frames) with the candidate background picture buffer and may determine the most recent candidate background picture in the candidate background picture buffer that matches a successfully-decoded frame from the successfully-decoded frames array. Recentness may be determined using the frame numbers. For example, if the frame numbers are ascending in terms of time of encoding, the highest matching frame numbers between the candidate background picture buffer and the successfully-decoded frames array may be selected as a new background picture for a PK-frame. Alternatively, a timestamp (e.g. a time of image capture, a time of data generation, a time of decoding, or a time of receipt of an acknowledgment) may be used to select a "most recent" picture.

The selected candidate background picture may be used to encode a new PK-frame (e.g., with information representing the change (difference) between the current scene and the selected candidate background picture). The new PK-frame may include metadata (e.g., in a real time protocol (RTP) header extension, as user data in supplemental enhancement information (SEI) as defined by high efficiency video coding (HEVC), etc.) that identifies an overlay frame identifier or protocol frame number of the PK-frame itself and metadata that identifies the overlay frame identifier or protocol frame number of the previous successfully decoded frame to use as the background picture for reconstructing the PK-frame.

Upon receipt of the PK-frame, the decoder may identify the metadata identifying the background picture to use as a reference and may decode all or a portion of the PK-frame to obtain difference information. The decoder may then add this decoded difference information from the PK-frame to the background picture (stored by the decoder in the good decoded frames buffer) identified based on the overlay frame identifier or protocol frame number provided in the metadata of the PK-frame. The decoder may flush a good decoded frames buffer apart from the newly-decoded frame which may be stored as a reference frame R0 (although in at least some preferred implementations, some frames may be retained for use as a potential background picture). Each successfully-decoded frame may be stored in the good decoded frames buffer and may be acknowledged as previously described and the process may continue as described above.

Using these techniques, it is possible to eliminate, or at least greatly reduce, I-frame transmission during streaming. Additionally, if there is no match between candidate background pictures stored by the encoder and successfully-decoded frames, the encoder may use a fail-safe mechanism to encode an I-frame to be sent to the decoder. These techniques may be particularly advantageous in cases where the camera device is relatively stationary, as the background pictures may be relatively static over time (relative to images captured by moving cameras).

In accordance with one or more preferred implementations, images to be utilized as background pictures are shared between the encoder and decoder for use during a streaming session outside of a streaming session, e.g. prior to a streaming session or outside of a bitstream of the streaming bitstream. This information is leveraged using the various techniques described herein to reduce the amount of information that is encoded and/or stored during streaming.

The various techniques described above and additional examples are described in additional detail below in reference to the figures.

FIG. 1 depicts an example system 100 for enhanced encoding and decoding of a video bit stream, in accordance with various embodiments of the present disclosure. In the example depicted in FIG. 1, a sender 106 may be a computing device that may comprise or be configured in communication with a camera 108. The sender 106 may be a camera device or video doorbell device. The sender 106 may execute an encoder 111. The encoder 111 may comprise software and/or hardware components, and may encode image data using any desired video streaming protocol and any desired compression/decompression protocol (e.g., any codec). For example, the system 100 may use HEVC (H.265), H.264, VP9, AV1, etc., or any other desired codec or protocol.

Camera 108 may be effective to capture image data representing a portion of a physical environment that is within a field-of-view of the camera 108. An image sensor of the camera 108 may transform light reflected from the environment into an array of pixel values and the pixel values and information about their respective positions (e.g., on a two-dimensional grid of pixels) may be stored as image data. An image signal processor (ISP) may perform various processing (e.g., demosaicing, white balance, gamma correction, de-noising, etc.) to transform the captured image data into a frame of image data (e.g., in YUV420 format) that may be sent as an input to encoder 111. In various examples described herein, the encoder 111 may compress such input image data prior to sending the image data to one or more remote devices (such as remote device 130).

In the example of FIG. 1, encoder 111 may regularly (e.g., periodically or otherwise) receive captured image data. Such image data may be intra-coded as an I-frame (block 112) and may be sent to the remote device 130 for potential use as a background picture. Additionally, the encoder 111 may decode and store the decoded frame as a background picture 113 (e.g., in candidate background picture buffer 120 and/or other memory). The decoder 131 of the remote device 131 may store these I-frames (block 114) in non-transitory computer-readable memory (e.g., in a circular buffer or other buffer). Each of these I-frames may be associated with frame identifier data (e.g., metadata used to distinguish the frame from other frames such as a frame number). The decoder 131 may send an acknowledgement message (block 116) to the encoder upon successful receipt and decoding of a frame. Encoder 111 may, in turn, store the frame identifier data (e.g., the frame numbers) included in the acknowledgement messages (block 118).

In various examples, a communication session between sender 106 (and/or camera 108) and remote device 130 may be established over a dedicated signaling socket (e.g., a transmission control protocol (TCP) socket). In an example, this communication channel may be used by the remote device 130 to send a session description protocol (SDP) offer message to the sender 106/camera 108 to create a communication session. In various examples, data identifying the most recent background picture 113 received by the remote device 130 may be sent together with the SDP offer message to the sender 106. Accordingly, for the initial GoP, the background picture 113 identified by the SDP offer message may be used to encode a first frame of an initial GOP as a PK-frame (as described in further detail below). Additionally, during video streaming, the SDP signaling protocol may remain open and may allow acknowledgement messages to be sent from the remote device 130 to sender device (e.g., acknowledgement messages identifying successfully-decoded frames, as described below).

In cases where the sender 106 computing device and/or camera 108 are relatively stationary, the background pictures 113 may not change much over time, absent motion in the scene and/or changing light conditions. Accordingly, frames for potential use as background pictures 113 may be transmitted relatively infrequently (e.g., every 1 minute, 2 minutes, 5 minutes, etc.) in order to conserve bandwidth, camera 108/sender 106 power consumption, etc.

At some point, a triggering event may occur which serves to initiate video streaming between the sender 106 and the remote device 130. For example, a motion sensor of camera 108 may detect motion and/or changing light conditions in the environment. For example, a PIR sensor, a computer-vision-based motion sensor, a Doppler-based motion sensor, etc., may be used to detect motion within the field-of-view of the camera 108. The detection of motion may trigger sender 106 to begin streaming video data to remote device 130. In some other examples, another triggering event may trigger the streaming. For example, a command may be received from remote device 130 (and/or from some other device) to initiate streaming of video. For example, a user may use a mobile application to initiate video streaming so that the user can monitor, in real time, the physical environment within the field-of-view of the camera 108.

In conventional H264/265 encoding, a current frame F0 may be encoded as a key frame using intra-frame encoding. For example, a current frame of raw image data F0 (e.g., encoded in YUV420 format) may be intra-coded (as an I-frame) to generate F0_coded (frame data) to be sent to the recipient device. The encoder may also decode the F0_coded frame to generate F0_decoded which may be stored as a reference frame R0. For a subsequent frame of raw image data F1, the encoder may encode F1 as a P-frame using inter-coding. For example, the difference between the raw image data F1 and the current reference frame R0 may be determined as Diff=F1-R0. The Diff may be encoded using P-frame syntax for transmission to the recipient. Additionally, on the encoder side, the difference may be decoded (to generate Diff_decoded) and added to the current reference frame R0 to generate an updated reference frame R1 (e.g., R1=Diff_decoded+R0). This process may continue on the encoder side until the end of the GoP is reached, at which point a new I-frame may be encoded as a key frame and the process may repeat.

On the decoder side in conventional H264/265 decoding, a first frame received may be F0_coded (an intra-coded frame). F0_coded may be decoded to generate F0_decoded. F0_decoded may be the decoded I-frame and may be stored as a reference frame R0. The next received frame of the GoP may be of P-frame syntax and may be inter-coded difference data. For example, the received frame may be Diff_coded. The Diff_coded frame may be decoded to generate Diff_decoded. Another reference frame R1 may be generated by the decoder as R1=Diff_decoded+R0. R1 may be stored in a buffer and used to decode the next P-frame, and so on. Note that using the conventional techniques described above I-frames are encoded and sent at the start of each GoP.

Various techniques are now described for enhanced video streaming and reference frame synchronization in accordance with various aspects of the present disclosure. Upon initiation of streaming, the encoder 111 may determine the most-recently acknowledged background picture 113 received from the decoder 131. An initial frame of image data F0 may be encoded as a predicted key frame (e.g., a PK-frame) (block 121) representing the difference between the current frame F0 and the most-recently acknowledged background picture 113 (e.g., Difference=F0−$BGP_0$). This may be accomplished by first generating delta data representing differences between the initial frame of image data (F0) and the most-recently acknowledged background picture ($BGP_0$). This may be determined by a simple subtraction operation for each pixel value or each macroblock value, or could involve a more complex determination or representation of differences, e.g. resembling or incorporating approaches and processes involved in generating predicted frames based on reference frames in accordance with H264.

In some examples, the PK-frame may be inter-coded in a manner similar to a P-frame in H264 only referencing the most-recently acknowledged background picture 113 received from the decoder 131. In such cases, the PK-frame may be difference encoded using inter-frame prediction between the current frame F0 and the most-recently acknowledged background picture 113 ($BGP_0$) using motion vectors to represent shifting blocks of pixels.

In other examples, a PK-frame may be intra-coded using I-frame syntax using the difference between the current frame F0 and the most-recently acknowledged background picture 113 ($BGP_0$) with all motion vectors being zero. The PK-frame may be diff_coded and sent to remote device 130 (block 123). Additionally, the encoder 111 may decode the PK-frame to generate diff_decoded (block 126). An initial reference frame R0 may be generated as R0=diff_decoded+$BGP_0$.

The remote device 130 receives the initial PK-frame (e.g., diff_coded (received)). Metadata included with the PK-frame (e.g., using SEI, an RTP header, a NAL unit, etc.) may indicate a frame identifier of the PK-frame itself (e.g., a frame number of the PK-frame) and a frame identifier of a previously sent frame (e.g., a frame identifier corresponding to background picture 113 $BGP_0$). Since the decoder 131 previously acknowledged successful receipt and decoding of this background picture 113 (e.g., at block 116), the identified background picture 113 should be available in memory. The decoder 131 may decode the received PK-frame (e.g., diff-coded (received)→diff_decoded). An initial reference frame R0 may be generated by decoder 131 as R0=diff_decoded+$BGP_0$ (using the stored background picture $BGP_0$). The successfully-decoded and reconstructed frame R0 may be stored in good decoded frame buffer 180 (GDF buffer 180) and the decoder 131 may send an acknowledgement message (block 128) to the encoder that identifies the frame number of the successfully-decoded frame.

Thereafter, for the initial GoP, each subsequent frame may be encoded by encoder 111 as a P-frame 124 (e.g., at encoding block 122). For example, a difference between a current frame of image data F1 and the current reference frame R0 may be determined as Diff=F1−R0. The difference (e.g., delta data) may be encoded as a P-frame (e.g., Diff_coded) that may be sent to the remote device 130. Additionally, encoder 111 may decode the Diff_coded to generate Diff_decoded and may generate an updated reference frame R1 (e.g., R1=Diff_decoded+R0) that may be stored in memory. This process may continue until the end of the GoP. Metadata that identifies the frame number of each P-frame may be sent (e.g., as SEI, RTP header information, etc.) together with each P-frame 124.

The decoder 131 may receive the Diff_coded P-frame and may decode the P-frame (block 126) to generate Diff_decoded. An updated reference frame R1 may be generated by decoder 131 as R1=Diff_decoded+R0. The updated and reconstructed reference frame R1 may store the successfully-decoded and reconstructed frame R1 in GDF buffer 180, and may send identifier data that identifies successfully-decoded frames (block 128) (e.g., by sending the frame numbers of the successfully-decoded frames). This decoder process may repeat for each P-frame of the GoP.

Upon receipt, the encoder 111 may store the identifier data (e.g., frame numbers) of the successfully-decoded frames (block 129) in an array of successfully-decoded frame identifiers 140. Accordingly, the encoder 111 may have a record indicating which frames of the current GoP were successfully decoded by decoder 131 (as some packets including frames may be corrupted, lost, or otherwise not decodable). As described previously, during the current GoP, the encoder 111 may periodically generate new candidate background pictures by combining difference information (delta data) of a current P-frame with the current reference frame (e.g., $BGP_{candidate}$=diff_decoded+$R_{current}$). Such candidate background pictures may be stored in background picture buffer 120. Any number of candidate background pictures may be generated. The candidate background pictures may reflect changing conditions in the scene (e.g., motion in scene and/or changing lighting conditions) as such changes may be occurring in the environment over time. As described below, the encoder 111 may select from among the candidate background pictures stored in the candidate background picture buffer 120 for use as a BGP for the subsequent GoP. It may be advantageous to limit the number of candidate background pictures generated and stored in order to minimize the size of the candidate background picture buffer 120 and/or to otherwise minimize consumption of computational resources and/or power consumption.

At the end of the current Gop (as determined by a GoP size parameter (e.g., n=50, 40, or any other desired GoP size), the encoder may determine a background picture (e.g., a BGP) to be used for a PK-frame for a next GoP from among the candidate background pictures stored in the candidate background picture buffer 120. The goal is for the encoder 111 to select a candidate background picture that corresponds to a recent successfully-decoded frame. Accordingly, the encoder 111 cross-references the candidate background picture buffer 120 with the array of successfully-decoded frame IDs 140 to determine a most-recent match. A detailed example is described below in reference to FIG. 2.

Figure 2:
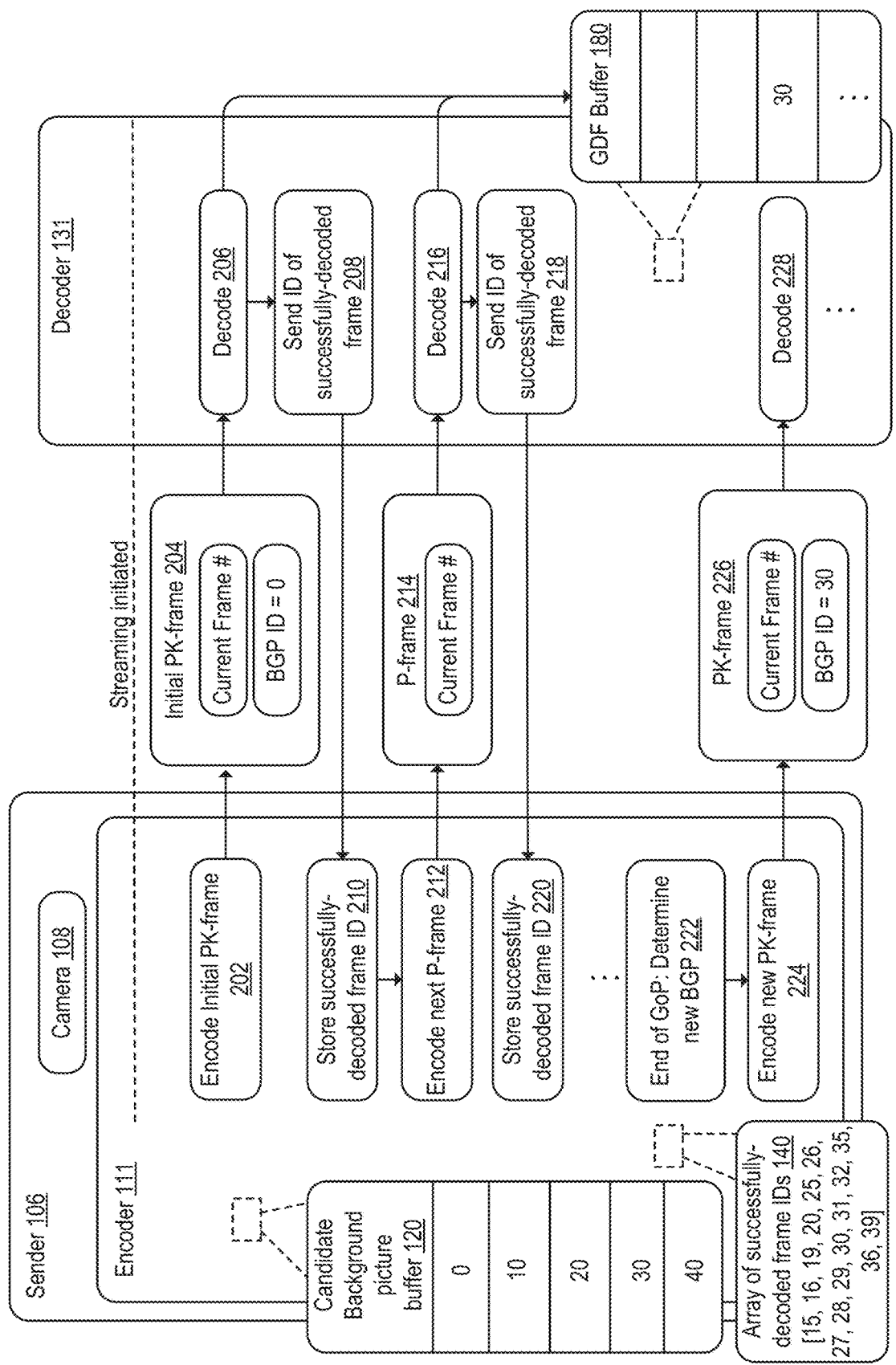
FIG. 2 depicts the example system of FIG. 1 with a reference frame synchronization example, in accordance with various embodiments of the present disclosure.

FIG. 2 depicts the example system of FIG. 1 with a reference frame synchronization example, in accordance with various embodiments of the present disclosure. In FIG. 2, streaming is initiated and an initial PK-frame 204 is encoded by the encoder 111 (block 202). As shown, the initial PK-frame 204 includes a current frame identifier (e.g., a frame number of the initial PK-frame 204 or other identifier data) as well as a frame identifier of a reference frame used to decode the initial PK-frame 204 (e.g., background picture (BGP) ID=0). This metadata (e.g., the current frame identifier and/or the reference frame identifier) may be encoded using an RTP header extension, as userdata in SEI (e.g., in the bitstream), in a network abstraction layer (NAL) header, etc.

The decoder 131 receives initial PK-frame 204 (diff_coded (received) and decodes it (block 206) to generate diff_decoded. The decoding operation may transform the difference information (e.g., delta data) from the transmitted bitstream to the image domain. The decoded information is added to the previously-stored background picture that corresponds to BGP ID=0 to generate an initial reference frame R0 for the GoP (e.g., R0=Diff_decoded+$BGP_0$). In this example, the frame corresponding to BGP ID=0 may be the most-recently acknowledged background picture (e.g., background picture 113 of FIG. 1) that was sent to the decoder 131 (e.g., prior to the initiation of streaming). The decoded and reconstructed frame R0 may be stored in GDF buffer 180 and the identifier data (e.g., the current frame number of the initial PK-frame 204) may be sent to encoder 111 (block 208). As previously described, the identifier data may be sent as an acknowledgement message using any desired protocol (e.g., RTCP)

The encoder 111 may store the successfully-decoded frame identifier data (block 210) in the array of successfully-decoded frame IDs 140. In other words, the frame identifier (or other identifier data) of the successfully-decoded frame may be stored in the array of successfully-decoded frame IDs 140. The encoder 111 may encode the next image data captured by the camera 108 as part of the video stream as a P-frame 214 (block 212). For example, a current frame F1 (e.g., encoded in YUV420 format) may be received by the encoder 111 from an image signal processor of sender 106. The difference between F1 and the current reference frame R0 may be determined (Diff=F1–R0). The difference (e.g., delta data) may be encoded to generate Diff_coded and sent to remote computing device as P-frame 214. P-frame 214 may include the current frame number (or other identifier data) identifying P-frame 214 from among other frames. Additionally, the encoder 111 may decode Diff_coded to generate Diff_decoded and may update the reference frame to generate reference frame R1 (e.g., R1=Diff_decoded+R0) . The updated reference frame R1 may be stored in memory and used to encode the next P-frame of the GoP and the process may continue.

The decoder 131 may receive the P-frame 214 (block 216) and may determine Diff_coded (received) in the P-frame 214. The decoder 131 may decode Diff_coded to generate Diff_decoded. The decoder 131 may generate an updated reference frame R1 by adding Diff_decoded to the current reference frame R0 (e.g., R1=Diff_decoded+R0). The updated reference frame R1 may be stored in the GDF buffer 180. Again, the decoder 131 may send the frame identifier (e.g., the frame number) of the successfully-decoded frame to the encoder (block 218). In various examples, the decoder 131 may send messages indicating frame identifiers of successfully-decoded frames. Additionally, in some examples, the decoder 131 may send frame identifiers of unsuccessfully-decoded frames along with data indicating that the frame numbers were unable to be successfully decoded. Continuing the example, the encoder 111 may again store the frame identifier (e.g., frame number) of the successfully-decoded P-frame in the array of successfully-decoded frame identifiers 140 (block 220). The encoder 111 may continue to encode image data of the video as P-frames until the GoP is concluded. As previously described, the encoder 111 may generate candidate background pictures and may store the candidate background pictures in a candidate background picture buffer 120.

In the example of FIG. 2, the GoP size may be 50 frames, and the encoder 111 may generate five evenly-spaced candidate background pictures (e.g., background pictures corresponding to frame numbers [0, 10, 20, 30, 40]) during the GoP). In this example, candidate background picture 0 may correspond to the initial PK-frame 204 combined with the BGP ID=0. Candidate background picture 10 may correspond to the difference information of a P-frame with frame number 10 being added to the current reference frame (e.g., R9), and so on. It should be noted, that the candidate background picture buffer 120 may be of any size and that encoder 111 may encode more or fewer candidate background pictures apart from what is shown in the example of FIG. 2. In some examples, the encoder 111 may generate as few as a single candidate background picture (in order to minimize buffer size and computational resource consumption). In some cases, the frequency at which the encoder 111 generates candidate background pictures may depend on the round trip latency of frames sent to the decoder 131 (e.g., the time between sending a frame and receiving an acknowledgement message for that frame). For example, if the latency is 6 frames (at a given frame rate), the optimal frame to use as a reference frame for a GoP size of 50 may be frame number 43 (the most recent frame that can be acknowledged in time when encoding frame number 50). Therefore, the encoder may use one of frames 40-43 to generate a candidate background picture. The timing of candidate background picture generation may be a tunable parameter and, in some cases, may be adjusted based on current latency conditions.

Further, in accordance with one or more preferred implementations, the encoder may utilize a reference frame buffer utilized to store reference frames for P-frames to also store frames for candidate background pictures, such that only one copy of a frame need be stored to both generate a P-frame using that frame as a reference frame and generate a PK-frame using that frame as a background picture. In accordance with one or more preferred implementations, a flag may be utilized to indicate whether a stored frame is a candidate background picture. In accordance with one or more preferred implementations, a key frame signaling mechanism, e.g. a signaling mechanism of an instantaneous decoding refresh picture, may not clear from such a buffer frames for which a flag is set indicating that the stored frame is a candidate background picture, with a separate buffer clearing approach or mechanism being utilized to clear or roll candidate background pictures.

Similarly, in accordance with one or more preferred implementations, a decoder may utilize a decoded frames buffer to store frames for use as both reference frames for P-frames and candidate background pictures for PK-frames, such that only one copy of a frame need be stored to both generate a P-frame using that frame as a reference frame and generate a PK-frame using that frame as a background picture. In accordance with one or more preferred implementations, a flag may be utilized to indicate whether a stored frame is a candidate background picture. In accordance with one or more preferred implementations, a key frame signaling mechanism, e.g. a signaling mechanism of an instantaneous decoding refresh picture, may not clear from such a buffer frames for which a flag is set indicating that the stored frame is a candidate background picture, with a separate buffer clearing approach or mechanism being utilized to clear or roll candidate background pictures.

At the end of the GoP, encoder 111 may determine a new background picture to be used to encode the PK-frame for the upcoming GoP (block 222). The encoder 111 may start with the most-recently generated candidate background picture (e.g., candidate background picture number 40) as this frame may reflect the most recent changes to the scene. The encoder 111 may perform a lookup of the array of successfully-decoded frame IDs 140 using frame number 40 as a query. In the example of FIG. 2, the array of successfully-decoded frame IDs 140 includes frame numbers [15, 16, 19, 20, 25, 26, 27, 28, 29, 30, 31, 32, 35, 36, 39]. Frame number 40 is not found in the array of successfully-decoded frame IDs 140. Accordingly, encoder 111 cannot use candidate background picture 40 to generate the next PK-frame since the decoder 131 has not acknowledged that this frame was successfully decoded (and thus may not have a good copy of this decoded frame in memory). Accordingly, the encoder 111 moves to the next most recent candidate background picture (e.g., candidate background picture number 30). The encoder 111 performs a lookup of the array of successfully-decoded frame IDs 140 using frame number 30 as a query and finds that frame number 30 is included in the array of successfully-decoded frame IDs 140. Accordingly, frame number 30 may be used as the background picture for the PK-frame of the upcoming GoP.

The encoder 111 then encodes a new PK-frame 226 (block 224). PK-frames may generally be distinguished by inclusion of frame identifier data identifying a reference frame to be used. As shown, PK-frame 226 includes both a current frame number of PK-frame 226 and also BGP ID=30, indicating that frame number 30 should be used to reconstruct a reference frame for the current GoP. The decoder 131 previously decoded a P-frame with frame number 30 and stored the decoded and reconstructed frame in the GDF buffer 180. When decoder 131 receives PK-frame 226, the metadata (e.g., SEI metadata, RTP header extension metadata, etc.) is parsed to determine that BGP ID=30 is to be used. The diff_coded information in PK-frame 226 may be decoded and added to the decoded frame corresponding to BGP ID=30 to generate an initial reference frame R0 for the current GoP. Decoder 131 searches the GDF buffer 180 using the BGP ID=30 as a query and locates successfully-decoded frame 30. The GDF buffer 180 is flushed apart from successfully-decoded frame 30. Successfully-decoded frame 30 is added to the diff_decoded information from PK-frame 226 to generate an initial reference frame R0 (block 228) (e.g., R0=diff_decoded+$GDF_{30}$). R0 may be stored in the GDF buffer 180 and the successfully-decoded frame may be acknowledged as described above. The above-described process may repeat until the conclusion of the video stream.

In an alternate example, encoder 111 may propose a frame number to be used as a BGP (background picture) for the next key frame (e.g., PK-frame) at the outset of a GoP (and/or during the current GoP). For example, after encoding frame 0, encoder 111 may send a message proposing using frame 25 as a background picture for the next GoP (e.g., at frame 50, the next key frame). Accordingly, the decoder 131 is informed about the background picture for the upcoming GoP before it has received the relevant frame (frame 25 in this example). Once the decoder receives the proposed frame (frame 25), the decoder 131 may send an acknowledgement message to the encoder indicating that the proposed frame 25 has been successfully decoded. The decoder 131 may store the decoded frame 25 in the GDF buffer 180. The encoder 111 may generate a single candidate background picture using frame 25, store it in the candidate background picture buffer 120, and may use the candidate background picture to encode the next PK-frame at the start of the next GoP.

The encoder 111 may receive the acknowledgement message prior to encoding the next key frame. For example, the encoder 111 may receive the acknowledgement as the encoder 111 is encoding frame 35 (assuming a 10 frame round-trip delay). If the acknowledgement message indicates that the decoder 131 successfully decoded the proposed background picture (e.g., frame 25), the encoder 111 may encode the next key frame (e.g., frame 50 if the GoP size is 50) as a PK-frame using frame 25 as the background picture. Otherwise, if no acknowledgement message is received for frame 25 (or a negative acknowledgement is received indicating that frame 25 was unable to be decoded), the encoder 111 may encode key frame 50 as an I-frame (e.g., as a failsafe mechanism). In this alternate example, the encoder 111 only stores a single candidate background picture (generated using frame 25 in the example). Accordingly, the size of the candidate background picture buffer 120 is reduced. Additionally, the decoder 131 only stores a single frame (a reconstructed frame generated using P-frame number 25 in the example) in the GDF buffer 180. Accordingly, in such examples, the GDF buffer 180 need only be large enough to store a single frame.

Figure 3:
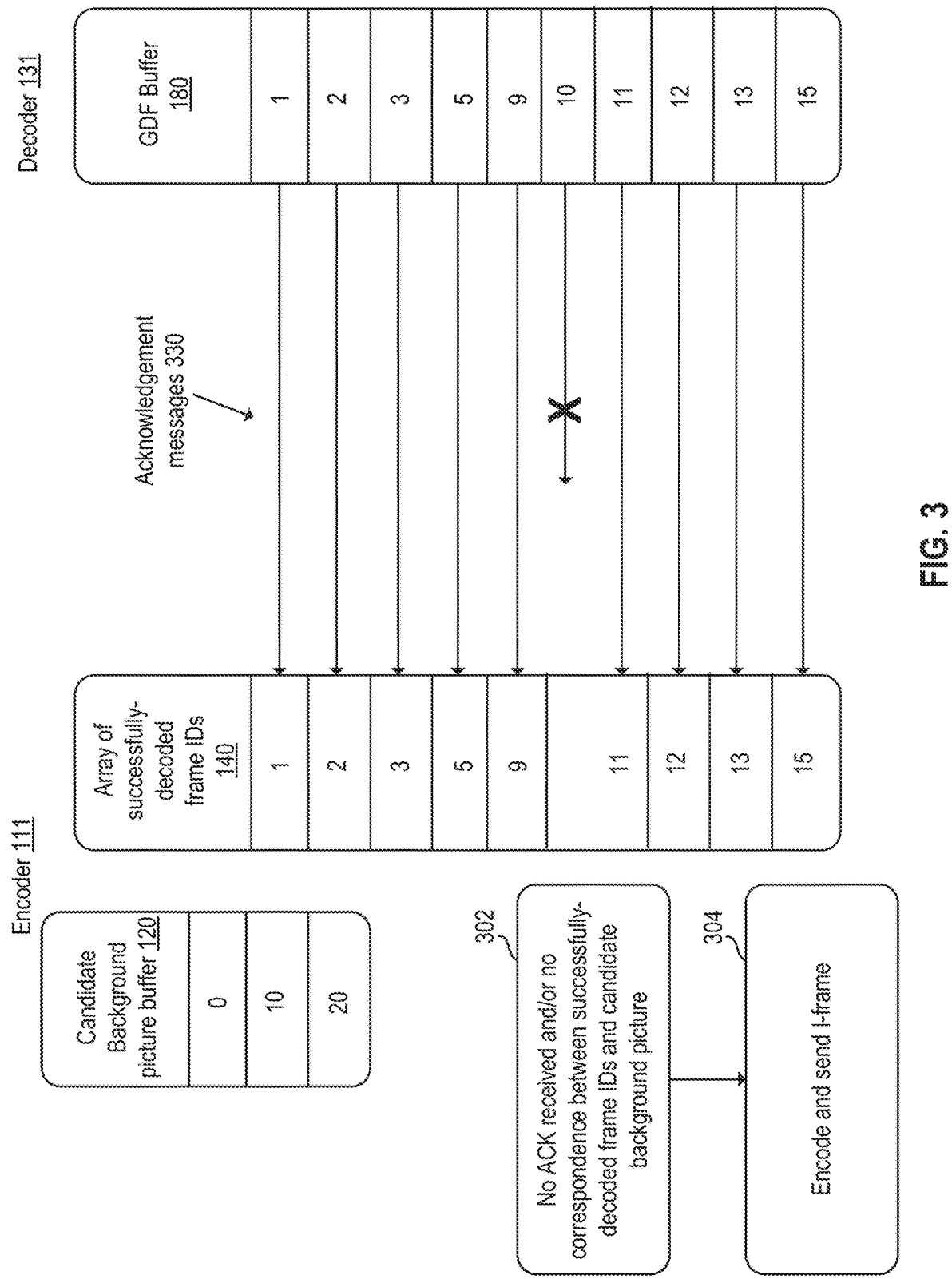
FIG. 3 depicts an example of a fail-safe mechanism for enhanced video encoding, in accordance with embodiments of the present disclosure.

FIG. 3 depicts an example of a fail-safe mechanism for enhanced video encoding, in accordance with embodiments of the present disclosure. In the example depicted in FIG. 3, the decoder 131 has stored various successfully-decoded and/or reconstructed frames in the GDF buffer 180. Specifically, frames associated with identifier data (e.g., frame numbers) [1, 2, 3, 5, 9, 10, 11, 12, 13, 15] have been stored in the GDF buffer 180. Acknowledgement messages 330 have been sent to provide identifier data (e.g., respective frame numbers) for each successfully decoded frame. In the example depicted in FIG. 3, the acknowledgement message for successfully-decoded frame 10 may not have arrived at the encoder 111. The encoder 111 stores the frame identifier data for each successfully-received acknowledgement message. In the example depicted in FIG. 3, the array of successfully-decoded frame IDs 140 includes frame IDs [1, 2, 3, 5, 9, 11, 12, 13, 15]. Note that due to the acknowledgement message associated with frame 10 being lost, this frame ID is not represented in the array of successfully-decoded frame IDs 140. Further, in the example depicted in FIG. 3, the candidate background picture buffer 120 of encoder 111 stores candidate background pictures with frame identifier data 0, 10, and 20.

At the beginning of a new GoP, the encoder 111 may select a new background picture for the upcoming GoP. Accordingly, assuming that candidate background picture 20 is the most recently-generated candidate background picture, encoder 111 may check to see if frame identifier data 20 (e.g., frame number 20) is found in the array of successfully-decoded frame IDs 140. In this case, no match is found. Accordingly, encoder 111 may check to see if frame identifier data 10 is found in the array of successfully-decoded frame IDs 140. Again, no match is found. Similarly, in the example, no match may be found for candidate background picture 0.

Accordingly, at block 302, the encoder may determine that no acknowledgement messages have been received and/or that there is no correspondence between the successfully-decoded frame IDs in the array of successfully-decoded frame IDs 140 and the candidate background pictures in candidate background picture buffer 120. This may be the case for a variety of reasons. For example, there may be a problem with the messaging protocol used to send the acknowledgement messages, there may be packet loss, there may be a network issue, etc. In some cases, the decoder may not have successfully decoded any frames that correspond to the candidate background pictures (e.g., due to corrupted data in the encoded frames, packet loss, etc.). In some further examples, an architecture may be used wherein the decoder 131 does not acknowledge the successfully-decoded frames. In any case, upon determining that no acknowledgement was received and/or that there is no correspondence between the successfully-decoded frame IDs and the candidate background pictures, the encoder 111 may encode current image data using intra-frame encoding (e.g., as an I-frame) and may send the I-frame (block 304). In such an example, the metadata associated with the frame will identify the current frame number and will also specify that the current frame number is to be used as a background picture for the current GoP (e.g., by specifying the current frame number in a field that has been designated to specify data identifying the reference frame). In other words, the current GoP may be coded using conventional H264/H265 coding techniques as a fail-safe mechanism.

Figure 4:
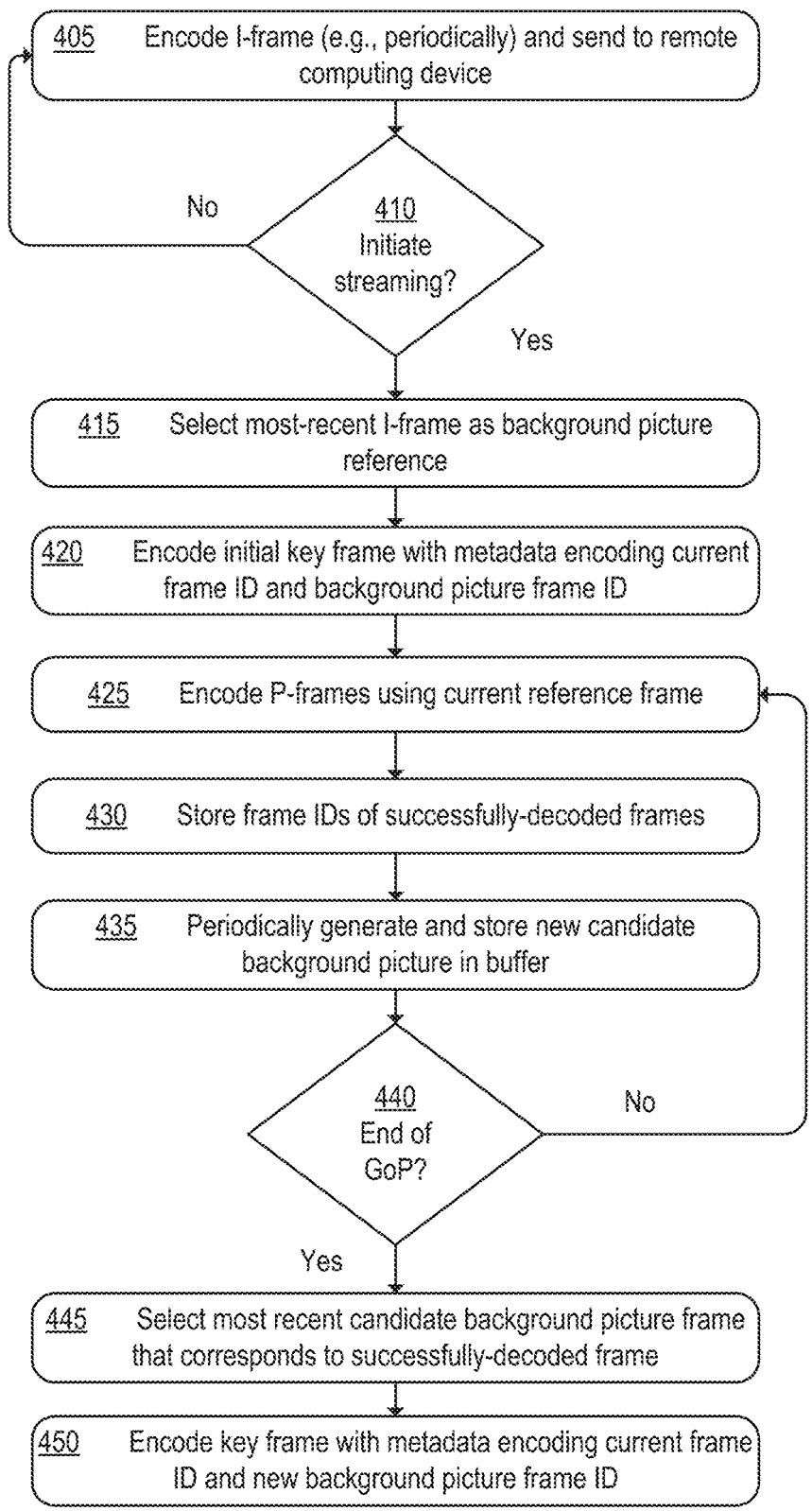
FIG. 4 depicts a flowchart illustrating an example process for enhanced video encoding, in accordance with embodiments of the present disclosure.

FIG. 4 depicts a flowchart illustrating an example process for enhanced video encoding, in accordance with embodiments of the present disclosure. In some examples, the process of FIG. 4 may be performed by a sender computing device (e.g., sender 106) and/or by a server computing device that receives a request for video transmission. In some examples, transmission of a video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 4 may be performed prior to receiving a request for a video streaming transmission. For example, the process of FIG. 4 may be performed to encode video data received from a camera or other device for later transmission or streaming. Although the example process is described with reference to the flowchart illustrated in FIG. 4, it will be appreciated that many other methods of performing the acts associated with the process may be used. For example, the order of some of the blocks may be changed, certain blocks may be combined with other blocks, blocks may be repeated, and some of the blocks described may be optional. The process illustrated in FIG. 4 may be performed by processing logic that may comprise hardware (circuitry, dedicated logic, etc.), software, or a combination of both. In some examples, the actions described in the blocks of the process illustrated in FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The process of FIG. 4 may begin at action 405 at which an I-frame may be encoded. The I-frame may be an example of a background picture that is periodically or semi-periodically sent from the encoder to the decoder. At action 410, a determination may be made whether streaming should be initiated. Streaming may be initiated upon detection of a triggering event, such as detection of motion within the field-of-view of the camera and/or receipt of a command to initiate streaming to a user device. If no triggering event has been detecting, processing may return to action 405 and another I-frame may be encoded at the appropriate interval.

If streaming is to be initiated, processing may continue to action 415, at which the most-recent I-frame (that was acknowledged by the decoder) may be selected as a background picture reference (e.g., background picture 113). Processing may continue to action 420, at which an initial key frame may be encoded (as a PK-frame) with metadata encoding the current frame ID and a background picture ID. For example, the initial key frame may be encoded as a PK-frame. The PK-frame may be associated with metadata that identifies the frame number of the PK-frame and a frame number identifying a frame to use as a background picture for the current GoP. In the example, the background picture may be the most-recently acknowledged I-frame (BGP) sent prior to the initiation of streaming. The encoder may determine the difference between a current frame F0 and the most-recently acknowledged I-frame (BGP$_0$) (e.g., Diff=F0−BGP$_0$). The difference may be encoded to generate Diff_coded and may be sent as the PK-frame. Additionally, the encoder may utilize a decoder to generate a reference frame R0=Diff_decoded+BGP$_0$.

Processing may continue at action 425, at which P-frames may be encoded using a reference frame. For example, for the current GoP, P-frames of image data may be encoded representing the difference between the current frame of image data and a reference frame (along with corresponding motion vectors referencing the reference frame). For a first P-frame, the difference information may be the frame difference between the current frame F1 and the current reference frame R0. The difference information may be encoded as Diff_coded and sent as a P-frame. Additionally, the encoder 111 may decode the Diff_coded to generate Diff_decoded and may generate an updated reference frame R1 (e.g., R1=Diff_decoded+R0).

At action 430, the encoder may store the frame identifiers (e.g., the frame numbers) of successfully-decoded frames. These frame identifiers of successfully-decoded frames may be received as acknowledgement messages from a decoder at a remote device. The decoder may use RTCP feedback messages, and/or other messages (e.g., using any desired messaging protocol) to send the acknowledgements. The frame IDs of the successfully-decoded frames may be stored by the encoder (e.g., encoder 111) in an array of successfully-decoded frame IDs 140.

At action 435, the encoder may periodically (or semi-periodically and/or at specified times) generate and store new candidate background pictures in the candidate background picture buffer 120. A candidate background picture may be a combination of the current reference frame (e.g., R$_n$) and the current image data being encoded (e.g., the difference information from the current P-frame).

At action 440, a determination may be made of whether the current GoP has concluded. For example, if the GoP size is 60 and the next frame to be encoded is frame number 60, the GoP has concluded. If the GoP has not yet concluded, processing may return to action 425. If the GoP has concluded, the encoder selects a background picture to use for a new PK-frame. Accordingly, processing may continue to action 445, at which the most recent candidate background picture that corresponds to a successfully-decoded frame is selected as the new background picture for a PK-frame for an upcoming GoP. For example, the encoder first checks the most recently-generated candidate background picture to see if the frame number corresponds to a frame number that was acknowledged as being successfully-decoded by the decoder. The encoder checks by searching the array of successfully-decoded frame IDs 140 using the candidate background picture number as a query. If no match is found, the encoder checks the next most recent candidate background picture, and so on. If no candidate background pictures match any of the frame IDs in the array of successfully-decoded frame IDs 140, the fail-safe mechanism described in FIG. 3 is used and an I-frame is encoded and sent to the remote device.

Processing may continue to action 450, at which current image data being encoded may be encoded as a key frame with metadata that encodes the current frame identifier and the new background picture identifier (e.g., metadata identifying the background picture selected at action 445). In other words, at action 450, a new PK-frame is encoded. So long as the fail-safe mechanism is not needed, there is no need to encode and transmit I-frames once streaming is initiated, conserving bandwidth and computing resources.

Figure 5:
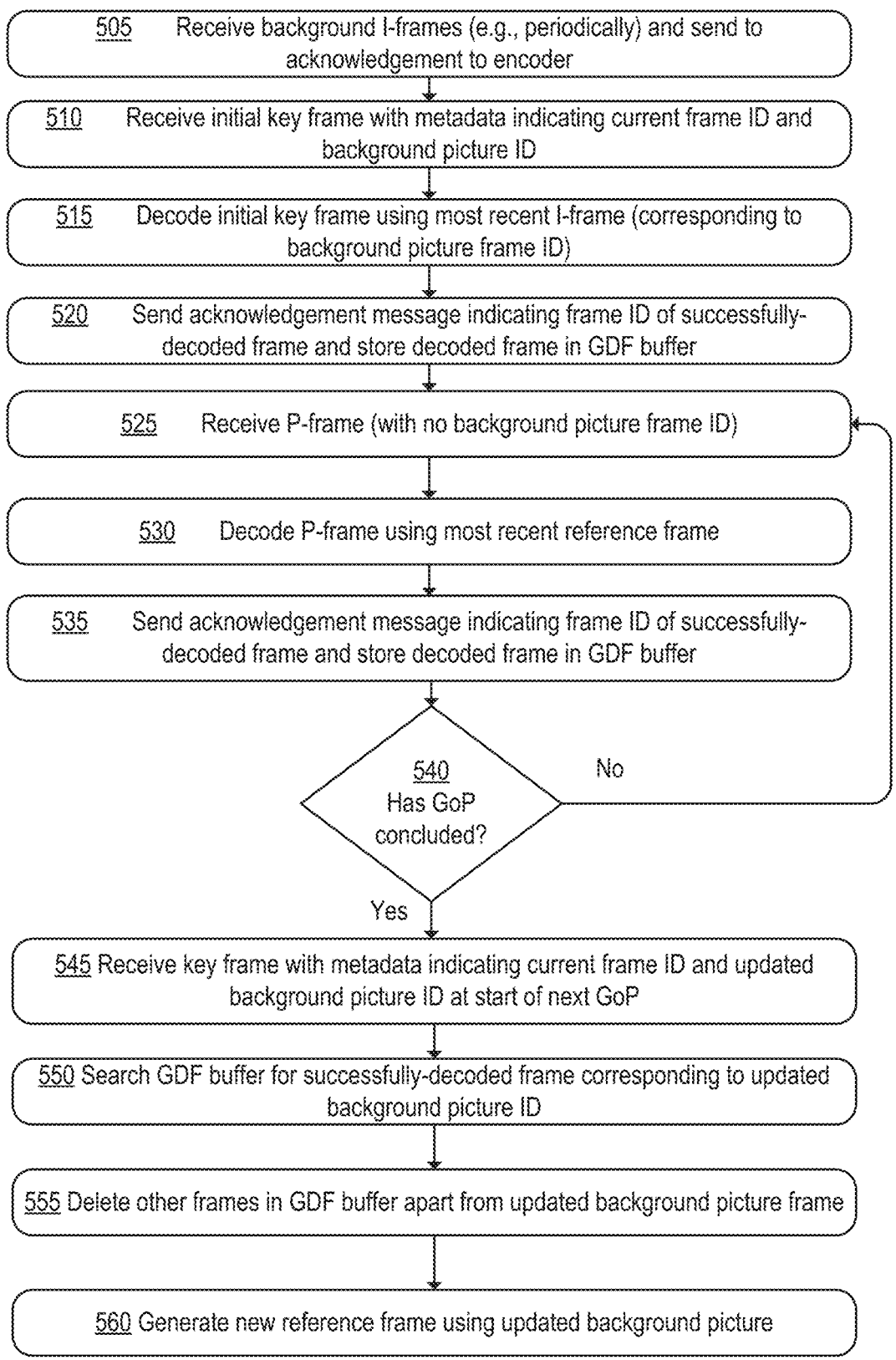
FIG. 5 depicts a flowchart illustrating an example process for enhanced video decoding, in accordance with embodiments of the present disclosure.

FIG. 5 depicts a flowchart illustrating an example process for enhanced video decoding, in accordance with embodiments of the present disclosure. In some examples, the process of FIG. 5 may be performed by a remote computing device (e.g., a remote device with respect to the encoder device) that requests a video streaming transmission and includes a decoder, such as a server and/or a user device. The process of FIG. 5 may begin with a request by a recipient computing device that a video stream be sent. For example, remote device 130 may request that a video stream be sent from a transmitter computing device, such as sender 106 depicted in FIG. 1. In some examples, the transmission of the video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP). Although the example process is described with reference to the flowchart illustrated in FIG. 5, it will be appreciated that many other methods of performing the acts associated with the process may be used. For example, the order of some of the blocks may be changed, certain blocks may be combined with other blocks, blocks may be repeated, and some of the blocks described may be optional. The process illustrated in FIG. 5 may be performed by processing logic that may comprise hardware (circuitry, dedicated logic, etc.), software, or a combination of both. In some examples, the actions described in the blocks of the process illustrated in FIG. 5 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The process of FIG. 5 may begin at action 505, at which the remote computing device may receive background I-frames (e.g., periodically). For each successfully-decoded background I-frame, the remote device may send an acknowledgement message to the encoder. For example, the encoder device may periodically encode image data from the camera as I-frames in order to provide snapshots of the scene within the field-of-view of the camera (e.g., camera 108). As such, a user may be able to request a still image of the scene that is relatively recent (depending on the frequency at which the I-frames are transmitted). In such an example, a companion application associated with the camera 108 may provide functionality enabling the user to request still images and/or see a relatively current view from the camera. Additionally, the user may be able to send a command to the camera 108 (and/or to encoder 111) to initiate a live video stream from the camera 108 to the remote device (e.g., a smart phone or other device executing a companion application and/or an intermediary server or servers).

Processing may continue at action 510, at which an initial key frame of a video frame may be received. The initial key frame may be a PK-frame received as the first frame of a GoP after initiation of streaming (e.g., after motion detection). In addition, metadata may be received that identifies the key frame and a background picture used to decode the key frame. In some examples, the metadata may be included in an RTP header. RTP packetizes frames. However, some frames can be larger in size than a single RTP packet and thus may be split among multiple packets. Accordingly, some logic may be used by the decoder to determine to which frame a particular RTP packet header is referring. In another example, SEI userdata may include the metadata. Advantageously, including metadata identifying the current frame identifier and/or the reference frame identifier in the SEI userdata includes such metadata directly in the bitstream. Accordingly, there is no disambiguation required to determine to which frame a particular frame number pertains, since the frame number metadata is included in the bitstream that defines the frame (without the added packet layer abstraction).

Processing may continue at action 515, at which an initial key frame of a GoP may be decoded using the most recently-received background picture (e.g., the I-frame received an acknowledged at action 505). This I-frame may be the frame that is identified by the background picture identifier included in the metadata described in reference to action 510. The key frame may be a PK-frame and may be the initial frame of a GoP (e.g., after motion detection or some other triggering event). For example, the PK-frame (key frame) received may include diff_coded (received) data. The decoder may decode the diff_coded received data to generate diff_decoded data. The decoder may generate a reconstructed frame by adding the diff_decoded data to the background picture data identified by the background picture ID (e.g., R0=diff_decoded+BGP$_0$). The successfully decoded and reconstructed frame (R0) may be stored in the GDF buffer.

Processing may continue at action 520, at which an acknowledgement message may be sent by the decoder device to the encoder device. The acknowledgement message may indicate the frame identifier of the successfully-decoded frame (e.g., the frame number of the initial PK-frame). The encoder may store the frame identifier in the array of successfully decoded frame identifiers 140. The decoded frame (e.g., R0) may be stored in the GDF buffer.

Processing may continue at action 525, at which a P-frame may be received. In various examples, this P-frame may be a frame of the current GoP that follows the PK-frame. Such P-frames may include metadata identifying the P-frame, but may, in some cases, not include a background picture identifier. The decoder may determine the encoded difference information of the P-frame (e.g., Diff_coded (received)) and may decode the difference information to generate Diff_decoded. The decoder may generate an updated reference frame (e.g., R1) by adding Diff_decoded to the current reference frame (e.g., R1=Diff_decoded+R0) and may thus decode the P-frame using the most recent reference frame (action 530).

Processing may continue at action 535, at which an acknowledgement message indicating the frame ID of the successfully-decoded frame may be sent from the decoder device to the encoder device. Additionally, the decoder may store the decoded frame (e.g., R1) in the GDF buffer. At action 540, if the current GoP has not yet concluded (e.g., if the GoP size has not yet been reached), the encoder will continue to encode and send P-frames representing image data captured by the camera(s). Accordingly, processing may return to action 525.

Conversely, if the GoP has concluded, processing may continue at action 545, at which a key frame with metadata indicating the current frame ID and the updated background picture ID may be received as an initial frame of the next GoP. This frame may be a PK-frame. As described above, the updated background picture may be selected by the encoder as the most recent candidate background picture with a frame number (or other frame identifier data) of a frame that was successfully-decoded by the decoder (as evidenced by the acknowledgement messages). The decoder may parse the metadata to identify the updated background picture ID (e.g., the frame number of the new background picture).

Processing may continue at action 550, at which the decoder may search the GDF buffer using the background picture ID as a search query and may identify a frame in the GDF buffer with the background picture ID. The decoder may delete any other frames in the GDF buffer (to conserve available buffer space) (action 555) apart from the updated background picture. The decoder may determine the diff_coded (received) information in the received key-frame (from action 545). The diff_coded information may be decoded by the decoder to generate diff_decoded information. A new reference frame R0 may be reconstructed by the decoder by adding the diff_decoded information to the successfully-decoded frame from the previous GoP identified by the background picture ID (block 560). The successfully decoded/reconstructed frame (e.g., R0) may be stored in the GDF buffer and an acknowledgement message may be sent to the encoder. The process may continue until the video streaming session is concluded.

As described herein, in accordance with one or more preferred implementations, encoded frame data is generated based on differences between image data for a captured image and background picture data for a stored background picture.

For example, the image data may comprise data for a plurality of pixels making up a captured image in a YUV format, e.g. a Y brightness or luma value and U and V chrominance or chroma values. The Y, U, and V pixel values can be represented separately, and processed separately.

The Y, U, and V pixel values can be logically and programmatically organized into macroblocks, e.g. 4×4, 8×8, or 16×6 macroblocks of pixel values. The Y pixel values for a macroblock may be characterized as the Y or luma components of the macroblock. Similarly, the U pixel values for the macroblock may be characterized as the U components of the macroblock, and the V pixel values for the macroblock may be characterized as the V components of the macroblock. In accordance with one or more preferred implementations, data for the chroma values is compressed or encoded at a higher compression or loss level. For example, a 16×16 macroblock may comprise 256 Y components (16×16), but only 64 U components (8×8) and 64 V components (8×8), with the U and V components being sub-sampled. In this regard, it will be appreciated that the human eye is more sensitive to changes in luminance than changes in chrominance. Preferably, each of the three components of a macroblock is processed separately, although processing for a macroblock, such as determination of a reference region for a macroblock, may be based on, and be utilized for, all three components.

In accordance with one or more preferred implementations, encoding a frame into a PK-frame based on a background picture can proceed for each set of Y, U, and V pixels values for a frame on a macroblock basis. Alternatively, in accordance with one or more preferred implementations, operations utilized to encode a frame into a PK-frame based on a background picture can be performed at a frame or slice level for each set of Y, U, and V pixels values for a frame or slice.

In accordance with one or more preferred implementations, determining difference or delta data between a background picture and a frame involves, for a plurality of macroblocks, subtracting component pixel values of a respective portion of a background picture from component pixel values of corresponding pixels of a corresponding portion of the frame. The result of this comparison can be characterized as a residual block.

In accordance with one or more preferred implementations utilizing operations at a macroblock level, this involves, for each respective macroblock, comparing the respective macroblock to one or more portions of pixel data for the background picture to identify a respective portion of the background picture to utilize as a reference region. This comparison can utilize a cost function or difference function which determines a difference between the respective macroblock and the compared portions of pixel data for the background picture. A cost function could then be utilized to determine a difference value for the respective determined residual block, with an algorithm operate to locate and select a portion of pixel data for the background picture with the lowest determined difference value.

This comparison for a respective portion of pixel data for the background picture could involve subtracting pixel values of the respective portion from corresponding pixel values of the respective macroblock (e.g. matrix subtraction). The result of this comparison can be characterized as a residual block.

In accordance with one or more preferred implementations, this delta or difference data is encoded by applying a transform (such as an integer transform) to the residual blocks to convert the data into another domain in which it is represented by transform coefficients, quantizing the transformed data, and encoding the quantized data utilizing an entropy encoding process.

In accordance with one or more preferred implementations, decoding then involves decoding the received frame data utilizing an entropy decoding process, inversely quantizing the decoded data, applying an inverse transform to generate reconstructed residual macroblocks, and calculating macroblocks for a reconstructed captured frame by, for each macroblock, adding component pixel values of the reconstructed residual macroblock to corresponding pixel values of the stored background picture.

In accordance with one or more preferred implementations, encoding differences between image data for a captured image and background picture data for a stored background picture comprises encoding motion vector information.

In accordance with one or more preferred implementations, such an approach involves, for each of a plurality of macroblocks for a frame, determining a respective portion of the first background picture data to use as a respective reference region for the respective macroblock based on comparing the respective macroblock to one or more portions of the first background picture data. In accordance with one or more preferred implementation, a motion-compensated frame is generated based on selected reference regions residual blocks are calculated based on subtracting component pixel values for a selected respective portion of background picture data from component pixel values of a macroblock.

Figure 6:
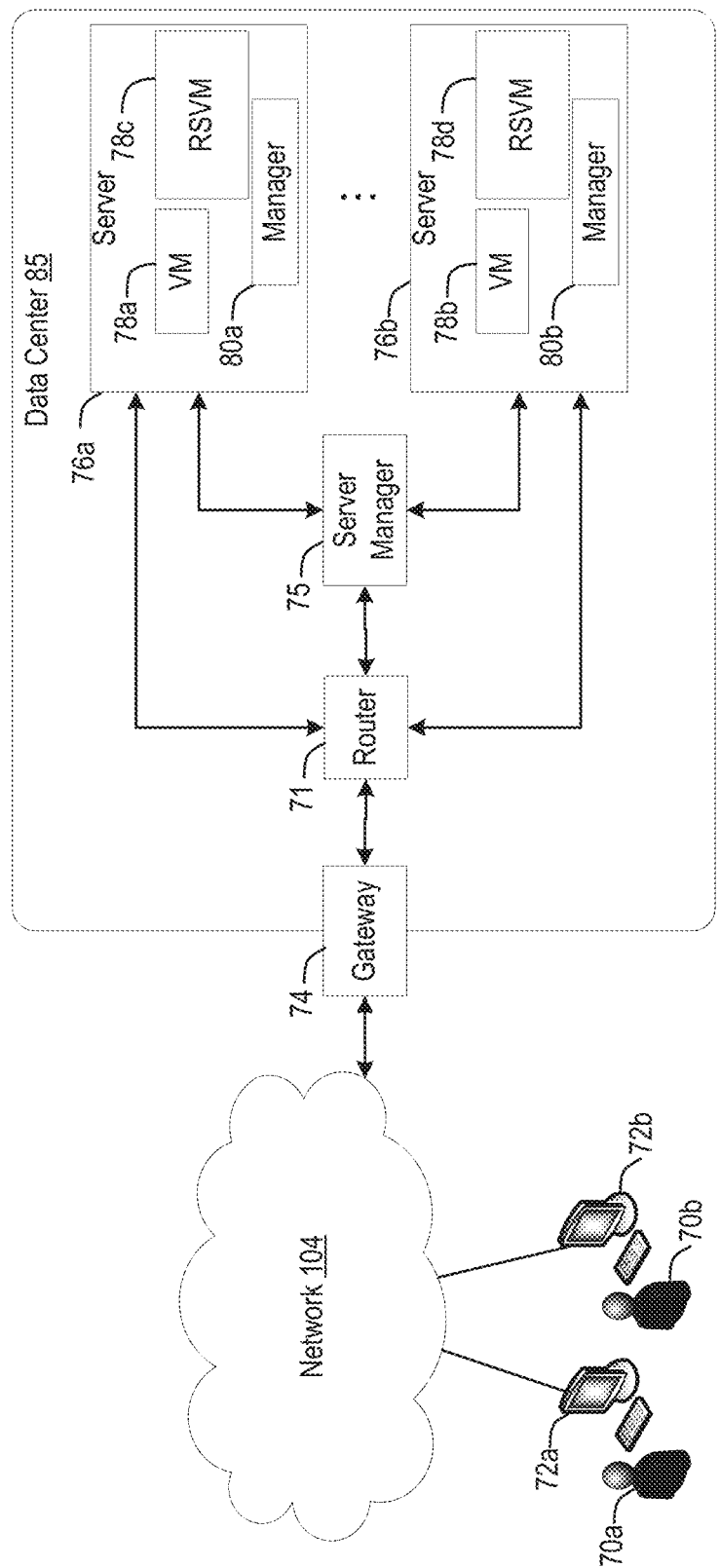
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. FIG. 6 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via network 104. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
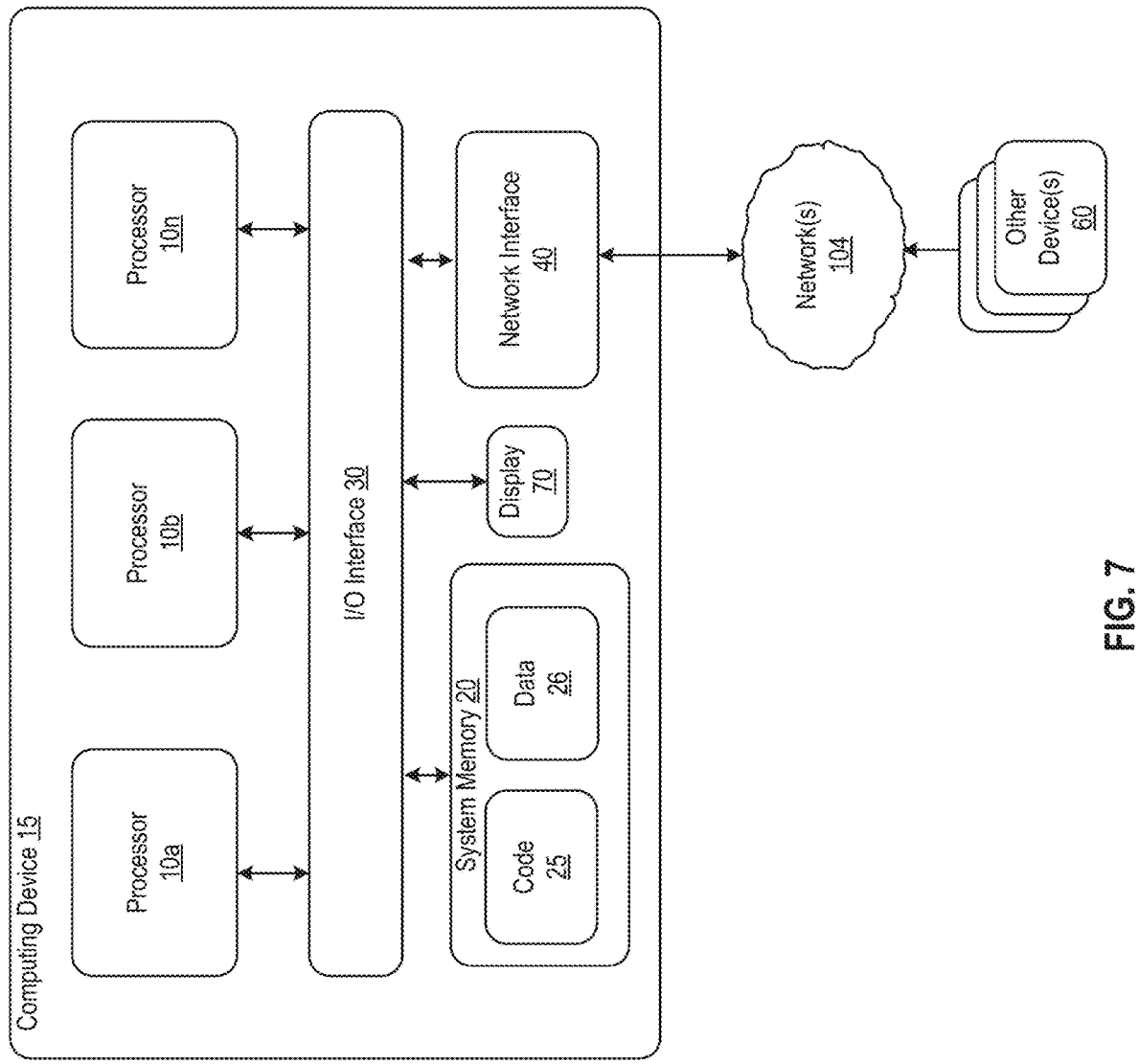
FIG. 7 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30. In various other examples, computing device 15 may include a display 70 effective to display a video stream and/or other graphics.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA. In an example where some component of system 100 (depicted in FIG. 1) is implemented by computing device 15, encoder 111 may be implemented by one or more of processors 10. In some examples, encoder 111 may comprise dedicated hardware, while in other examples, encoder 111 may be software executable by one or more of processors 10. In still other examples, encoder 111 may comprise some combination of hardware and software. For example, encoder 111 may be implemented through a combination of instructions stored in system memory 20 and executable by one or more of processors 10 and one or more dedicated processors, such as a graphical processing unit (GPU), application specific integrated circuit (ASIC), field programmable gate array (FPGA), or the like. System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 20 as code 25 and data 26. In various examples, system memory 20 may comprise one or more of the buffers described above with respect to FIGS. 1-6.

In an example where remote device 130 (depicted in FIG. 1) is implemented by computing device 15, decoder 131 may be implemented by one or more of processors 10. In some examples, decoder 131 may comprise dedicated hardware, while in other examples, decoder 131 may be software executable by one or more of processors 10. In still other examples, decoder 131 may comprise some combination of hardware and software. For example, decoder 131 may be implemented through a combination of instructions stored in system memory 20 and executable by one or more of processors 10 and/or one or more dedicated processors, such as a graphical processing unit (GPU), application specific integrated circuit (ASIC), field programmable gate array (FPGA), or the like.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 104, such as other computer systems or devices, cameras, etc. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 8:
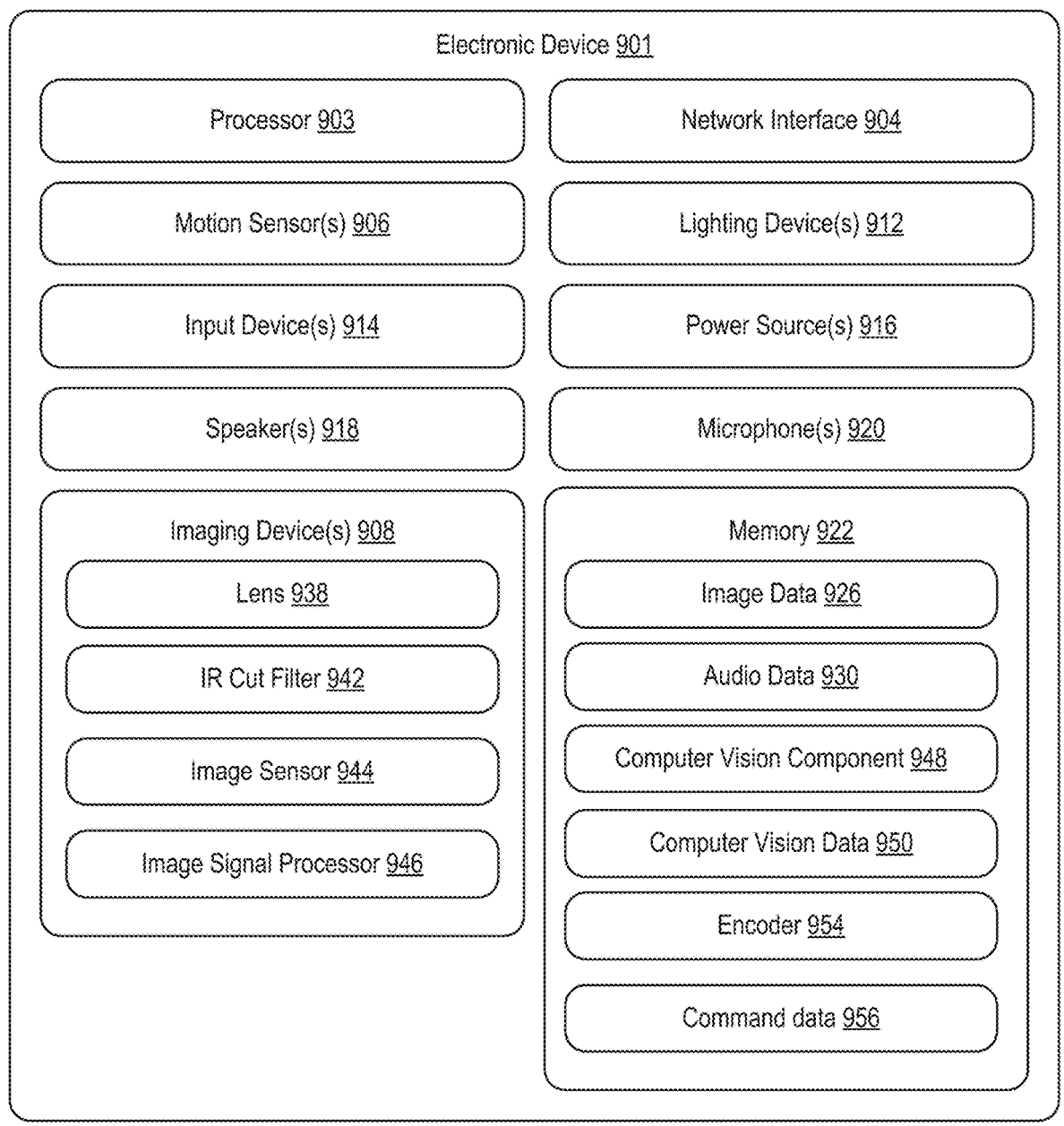
FIG. 8 is a diagram illustrating an electronic device including an imaging device in accordance with various aspects of the present disclosure.

FIG. 8 illustrates an example architecture of an electronic device 901. As shown, the electronic device 901 may include one or more processors 903, one or more network interfaces 904, one or more motion sensors 906, one or more imaging devices 908, one or more lighting devices 912, one or more input devices 914, one or more power sources 916, one or more speakers 918, one or more microphones 920, and memory 922 (non-transitory computer-readable memory).

The motion sensor(s) 906 may be any type of sensor capable of detecting and communicating the presence of an object within their field-of-view. As such, the motion sensor(s) 906 may include one or more (alone or in combination) different types of motion sensors. For example, in some embodiments, the motion sensor(s) 906 may comprise passive infrared (PIR) sensors, which may be secured on or within a PIR sensor holder that may reside behind a lens (e.g., a Fresnel lens). In such an example, the PIR sensors may detect IR radiation in a field-of-view, and produce an output signal (typically a voltage) that changes as the amount of IR radiation in the field-of-view changes. The amount of voltage in the output signal may be compared, by the processor(s) 903, for example, to one or more threshold voltage values to determine if the amount of voltage in the output signal is indicative of motion, and/or if the amount of voltage in the output signal is indicative of motion of an object that is to be captured by the imaging device(s) 908. In some examples, the processor(s) 903 may determine the distance based on the amount of voltage in the output signal. Additionally, or alternatively, in some examples, the processor(s) 903 may determine the distance based on which motion sensor 906 detected the object.

Although the above discussion of the motion sensor(s) 906 primarily relates to PIR sensors, depending on the example, the motion sensor(s) 906 may include additional and/or alternate sensor types that produce output signals including alternative data types. For example, and without limitation, the output signal may include an amount of voltage change based at least in part on the presence of infrared radiation in a field-of-view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906.

An imaging device 908 may include any device that includes an image sensor 944, such as a charge-coupled device (CCD) and/or an active-pixel sensor (CMOS sensor), that is capable of generating image data 926 (which may represent, and/or include, the frames of image data described herein), representing one or more images (e.g., a video). The imaging device 908 may include a lens 938 that is effective to focus light on the image sensor 944. In one aspect of the present disclosure, the image sensor 944 may comprise a complementary metal-oxide semiconductor (CMOS) array and may be capable of recording high definition (e.g., 722*p*, 1800*p*, 4K, 8K, etc.) image and/or video files. The image sensor 944 may comprise a plurality of photosensors that may transform light into electrical signals. Such electrical signals may be represented by numerical values (e.g., floating point numbers) that may be processed using the image signal processor 946. Each photosensor of the image sensor 944 corresponds to a pixel in a frame of image data (e.g., a frame of uncompressed image data, sometimes referred to as a frame of "raw" image data) captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

Additionally, in some examples, the imaging device(s) 908 may include a mechanically-actuated IR cut filter 942 that may be interposed between the lens 938 and the image sensor 944 in order to filter out infrared light. Note that the IR cut filter 942 is optional and may be omitted in some implementations. In some other examples, the image sensor may be coated with a dual band-pass filter that has a passband at about 900 nm to allow IR color reproduction during the day and also to allow IR light detection when the imaging device(s) 908 are in night mode. The imaging device 908 may include a separate image signal processor 946, or the processor(s) 903 may perform the camera processing functionality. The processor(s) 903 (and/or camera processor) may include an encoding and compression chip. In some embodiments, the processor(s) 903 (and/or the camera processor) may comprise a bridge processor. The processor(s) 903 (and/or the camera processor) may process video recorded by the image sensor and may transform this data into a form suitable for transfer by the network interface(s) 904. In various examples, the imaging device 908 also includes memory, such as volatile memory that may be used when data is being buffered or encoded by the processor(s) 903 (and/or the camera processor). For example, in certain embodiments the camera memory may comprise synchronous dynamic random-access memory (SD RAM).

The lighting device(s) 912 may be one or more light-emitting diodes capable of producing visible light and/or infrared light when supplied with power (e.g., to enable night vision). In some embodiments, when activated, the lighting device(s) 912 illuminates a light pipe. In some examples, the electronic device 901 uses the lighting device(s) 912 to illuminate specific components of the electronic device 901, such as the input device(s) 914. This way, users are able to easily see the components when proximate to the electronic device 901.

An input device 914 may include, but is not limited to, a button, a touch-sensitive surface, a switch, a slider, and/or any other type of device that allows a user to provide input to the electronic device 901. For example, if the electronic device 901 includes a doorbell, then the input device 914 may include a doorbell button. In some examples, based on receiving an input, the processor(s) 903 may receive a signal from the input device 914 and use the signal to determine that the input device 914 received the input. Additionally, the processor(s) 903 may generate input data representing the input received by the input device(s) 914. For example, the input data may represent the type of input (e.g., a push to a button), a time that the input occurred, and/or the like.

The power source(s) 916 may include one or more batteries that provide power to the electronic device 901. However, in other examples, the electronic device 901 may not include the power source(s) 916. In such examples, the electronic device 901 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 918 may be any electromechanical device capable of producing sound in response to an electrical signal input. The microphone(s) 920 may be an acoustic-to-electric transducer or sensor capable of converting sound waves into audio data 930 representing the sound. The speaker(s) 918 and/or microphone(s) 920 may be coupled to an audio CODEC to enable digital audio received by user devices to be decompressed and output by the speaker(s) 918 and/or to enable audio data captured by the microphone(s) 920 to be compressed into digital audio data 930. In some examples, the electronic device 901 includes the speaker(s) 918 and/or the microphone(s) 920 so that the user associated with the electronic device 901 can communicate with one or more other users located proximate to the electronic device 901. For example, the microphone(s) 920 may be used to generate audio data representing the speech of the one or more other users, which is then sent to the sender 106 (e.g., a camera device). Additionally, the speaker(s) 918 may be configured to output user speech of the user, where the user's user speech may also be represented by audio data 930.

In some examples, the electronic device 901 determines that the start of the video is the first frame of the video. In some examples, such as when the electronic device 901 continuously generates the image data 926 (e.g., the electronic device 901 does not turn off the imaging device(s) 908), the start of the video corresponds to the portion of the video that the imaging device(s) 908 were generating right after detecting a triggering event. For example, the start of the video may correspond to the first frame of the video after detecting the event. In other examples, such as when the electronic device 901 does not continuously generate the image data 926 (e.g., the electronic device 901 turns off the imaging device(s) 908 until detecting an event such as a motion event), the start of the video corresponds to the first frame of the video that is generated by the imaging device(s) 908.

Encoder 954 may encode uncompressed image data captured by imaging device 908 as intra-coded frames and/or inter-coded frames using one or more of a variety of image compression/decompression protocols. For example, the electronic device 901 may use HEVC (H.265), H.264, VP9, AV1, etc., or any other desired codec to encode image data prior to transmission. Although not shown in FIG. 8, the memory 922 may also include the array of successfully-decoded frame IDs 140 and/or the candidate background picture buffer 120, as described above.

As further illustrated in the example of FIG. 8, the electronic device 901 may include the computer-vision component 948. The computer-vision component 948 may be configured to analyze the image data 926 using one or more computer-vision techniques and output computer-vision data 950 based on the analysis. The computer-vision data 950 may represent information, such as the presence of an object represented by the image data 926, the type of object represented by the image data 926, locations of the object relative to the electronic device 901, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 950 may further represent a bounding box indicating the respective location of each object represented by the image data 926. Such detection information (e.g., bounding boxes, classification labels, segmentation masks, etc.) may, in some cases, be encoded and sent together with frames of compressed image data to a remote computing device (e.g., during streaming or otherwise).

For example, the computer-vision component 948 may analyze the image data 926 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 948 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 948 may use object detection technique(s) that use computer-vision analysis to perform informative region selection, features extraction, and then classification of object(s) represented by the image data 926. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 901 may also store command data 956. In some circumstances, a user of the electronic device 901 may want to receive a live view from the electronic device 901. The command data 956 may represent an identifier associated with the electronic device 901, a command to generate the image data 926, a command to send the image data 926, and/or the like. In some examples, the electronic device 901 may then analyze the command data 956 and, based on the identifier, determine that the command data 956 is directed to the electronic device 901. For example, the electronic device 901 may match the identifier represented by the command data 956 to an identifier associated with, and stored by, the electronic device 901. Additionally, the electronic device 901 may cause the imaging device(s) 908 to begin generating the image data 926 (e.g., if the imaging device(s) 908 are not already generating the image data 926) and send the image data 926 to the remote device 130 and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
   prior to initiation of a first video streaming session,
   receiving, by a computing system, first frame data representing a first frame; and
   storing, in one or more non-transitory computer readable media, background picture data associated with the first frame;

during the first video streaming session,
receiving, by the computing system, second frame data representing a second frame;
generating, by a decoder using the second frame data, third frame data representing decoded frame data; and
generating, using the third frame data and the background picture data associated with the first frame, fourth frame data representing the second frame.

2. The method of claim 1, comprising:
sending acknowledgment data to a camera device, the acknowledgment data comprising an identifier associated with the second frame.

3. The method of claim 1, comprising:
storing the fourth frame data in a first buffer; and
sending, to a camera device, acknowledgment data indicating a first frame identifier corresponding to the second frame.

4. The method of claim 3, comprising:
receiving, by the computing system, fifth frame data encoded as a predictive frame with reference to the second frame, the fifth frame data representing a third frame;
generating, by the decoder using the fifth frame data and the fourth frame data, sixth frame data representing the third frame;
storing the sixth frame data in the first buffer; and
sending, to the camera device, second acknowledgment data indicating a second frame identifier corresponding to the third frame.

5. The method of claim 1, wherein the first frame data comprises a first identifier associated with the first frame, the second frame data comprises the first identifier associated with the first frame, and the method further comprises determining, based at least in part on the first identifier in the second frame data, that the second frame data is decoded using the background picture data associated with the first frame.

6. The method of claim 1, wherein the second frame data represents an initial frame of the first video streaming session.

7. A system comprising:
one or more processors;
a decoder; and
one or more computer-readable media storing computer-executable instructions that, when executed using the one or more processors, cause the system to perform operations comprising:
prior to initiation of a first video streaming session,
receiving first frame data representing a first frame; and
storing, in one or more non-transitory computer readable media,
background picture data associated with the first frame; and
during the first video streaming session,
receiving second frame data representing a second frame;
generating, by the decoder using the second frame data, third frame data representing decoded frame data; and
generating, using the third frame data and the background picture data associated with the first frame, fourth frame data representing the second frame.

8. The system of claim 7, the one or more computer-readable media storing further computer-executable instructions that, when executed using the one or more processors, cause the system to perform further operations comprising sending acknowledgment data to a camera device, the acknowledgment data comprising an identifier associated with the second frame.

9. The system of claim 7, the one or more computer-readable media storing further computer-executable instructions that, when executed using the one or more processors, cause the system to perform further operations comprising:
storing the fourth frame data in a first buffer; and
sending, to a camera device, acknowledgment data indicating a first frame identifier corresponding to the second frame.

10. The system of claim 9, the one or more computer-readable media storing further computer-executable instructions that, when executed using the one or more processors, cause the system to perform further operations comprising:
receiving fifth frame data encoded as a predictive frame with reference to the second frame, the fifth frame data representing a third frame;
generating, by the decoder using the fifth frame data and the fourth frame data, sixth frame data representing the third frame;
storing the sixth frame data in the first buffer; and
sending, to a camera device, second acknowledgment data indicating a second frame identifier corresponding to the third frame.

11. The system of claim 7, wherein the first frame data comprises a first identifier associated with the first frame, the second frame data comprises the first identifier associated with the first frame, and wherein the one or more computer-readable media store further computer-executable instructions that, when executed using the one or more processors, cause the system to perform further operations comprising determining, based at least in part on the first identifier in the second frame data, that the second frame data is decoded using the background picture data associated with the first frame.

12. The system of claim 7, wherein the second frame data represents an initial frame of the first video streaming session.

13. A camera device, comprising:
a camera;
one or more processors; and
one or more computer-readable media storing computer executable instructions which, when executed using the one or more processors, cause the camera device to perform operations comprising:
prior to initiation of a first video streaming session,
generating first image data,
encoding the first image data into first frame data representing a first frame,
sending the first frame data to a remote computing system,
decoding the first frame data into first background picture data representing the first frame, and
storing, in the one or more computer-readable media, the first background picture data representing the first frame; and
after storing of the first background picture data representing the first frame,
generating second image data,
generating delta data representing differences between the second image data and the first background picture data associated with the first frame,
encoding the delta data into second frame data representing a second frame, and sending the second frame data to the remote computing system, wherein the second frame data represents an initial frame of the first video streaming session.

14. The camera device of claim 13, the one or more computer-readable media storing further computer-executable instructions that, when executed using the one or more processors, cause the camera device to perform further operations comprising:

generating third image data;

generating, by encoding the third image data, third frame data representing a third frame, the third frame data being encoded as a predictive frame with reference to one or more other frames;

generating, using the third frame data and data for the one or more other frames, second background picture data representing the third frame; and storing, in the one or more computer-readable media, the second background picture data representing the third frame.

15. The camera device of claim 13, the one or more computer-readable media storing further computer-executable instructions that, when executed using the one or more processors, cause the camera device to perform further operations comprising:

receiving acknowledgment data indicating a first frame identifier of a successfully-decoded frame;

adding the first frame identifier to a stored list of identifiers of successfully decoded frames;

determining a second frame identifier associated with stored second background picture data; and searching the stored list using the second frame identifier.

16. The camera device of claim 15, wherein the stored second background picture data corresponds to a most recent background picture candidate among a plurality of background picture candidates, the one or more computer-readable media storing further computer-executable instructions that, when executed using the one or more processors, cause the camera device to perform further operations comprising:

determining that the second frame identifier is in the stored list;

generating, by the camera device, third image data;

generating, based at least in part on differences between the third image data and a second background picture data, third frame data representing a third frame; and sending the third frame data to the remote computing system.

17. The camera device of claim 16, wherein the third frame data comprises the second frame identifier and a third frame identifier associated with the third frame.

18. The camera device of claim 13, wherein the first frame data comprises a first identifier associated with the first frame, and the second frame data comprises a second identifier associated with the second frame and the first identifier associated with the first frame, and wherein the one or more computer-readable media storing further computer-executable instructions that, when executed using the one or more processors, cause the camera device to perform further operations comprising, prior to the initiation of the first video streaming session, receiving, from the remote computing system, acknowledgment data comprising the first identifier associated with the first frame, wherein the first background picture data representing the first frame is used to generate the second frame data based at least in part on the receiving of the acknowledgment data comprising the first identifier.

19. The camera device of claim 13, the one or more computer-readable media storing further computer-executable instructions that, when executed using the one or more processors, cause the camera device to perform further operations comprising:

receiving acknowledgment data indicating frame identifiers of successfully-decoded frames;

storing the acknowledgement data in the one or more computer-readable media;

determining at least one candidate background picture;

determining that the at least one candidate background picture does not correspond to any frame identifier of the acknowledgment data;

generating, by the camera device, third image data; and generating, using the third image data, third frame data representing a third frame, the third frame data being intra-coded such that it is capable of being decoded without reference to another frame.

20. The camera device of claim 13, wherein the first frame data comprises a first identifier associated with the first frame, and the second frame data comprises a second identifier associated with the second frame and the first identifier associated with the first frame.

* * * * *